(12) United States Patent
Sakashita et al.

(10) Patent No.: US 8,530,803 B2
(45) Date of Patent: Sep. 10, 2013

(54) HONEYCOMB STRUCTURE

(71) Applicant: NGK Insulators, Ltd., Nagoya (JP)

(72) Inventors: Satoshi Sakashita, Nagoya (JP); Yoshimasa Omiya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/628,740

(22) Filed: Sep. 27, 2012

(65) Prior Publication Data

US 2013/0043237 A1 Feb. 21, 2013

Related U.S. Application Data

(63) Continuation of application No. PCT/JP2011/058175, filed on Mar. 31, 2011.

(30) Foreign Application Priority Data

Mar. 31, 2010 (JP) .................................. 2010-082755
Aug. 12, 2010 (JP) .................................. 2010-180898

(51) Int. Cl.
*H05B 11/00* (2006.01)
*H01C 13/00* (2006.01)

(52) U.S. Cl.
USPC ........... 219/553; 219/541; 338/306; 338/307; 338/308; 338/309

(58) Field of Classification Search
USPC ......... 219/553, 541; 338/306–314, 321–333; 422/168, 211, 221; 428/116; 427/397.7
See application file for complete search history.

(56) References Cited

U.S. PATENT DOCUMENTS

| | | | | |
|---|---|---|---|---|
| 5,063,029 A | * | 11/1991 | Mizuno et al. | 422/175 |
| 5,266,278 A | * | 11/1993 | Harada et al. | 422/174 |
| 5,288,975 A | * | 2/1994 | Kondo | 219/552 |
| 6,696,131 B1 | * | 2/2004 | Nishimura et al. | 428/116 |

(Continued)

FOREIGN PATENT DOCUMENTS

JP  07-185264 A1  7/1995
JP  2931362 B2  8/1999

(Continued)

OTHER PUBLICATIONS

U.S. Appl. No. 13/591,494, filed Aug. 22, 2012, Noguchi et al.

(Continued)

*Primary Examiner* — Sang Paik
*Assistant Examiner* — Renee L Miller
(74) *Attorney, Agent, or Firm* — Burr & Brown

(57) ABSTRACT

There is disclosed a honeycomb structure including a honeycomb structure section, and a pair of band-like electrode sections arranged on a side surface of the honeycomb structure section, an electrical resistivity of the honeycomb structure section is from 1 to 200 Ωcm, in a cross section which is perpendicular to a cell extending direction, the one electrode section is disposed on an opposite side of the other electrode section via the center O, an angle which is 0.5 time as large as a central angle of the electrode section is from 15 to 65°, and each of the electrode sections is formed so as to become thinner from a center portion in a peripheral direction toward both ends in the peripheral direction, and in the cross section which is perpendicular to the extending direction of the cells, the whole outer peripheral shape is a round shape.

20 Claims, 9 Drawing Sheets

(56) References Cited

U.S. PATENT DOCUMENTS

| | | |
|---|---|---|
| 2003/0134084 A1 | 7/2003 | Ichikawa et al. |
| 2012/0076698 A1 | 3/2012 | Ishihara |
| 2012/0076699 A1 | 3/2012 | Ishihara |
| 2012/0183725 A1 | 7/2012 | Noguchi et al. |
| 2012/0187109 A1 | 7/2012 | Noguchi et al. |

FOREIGN PATENT DOCUMENTS

| | | | |
|---|---|---|---|
| JP | 11-253814 A1 | | 9/1999 |
| JP | 4136319 | B2 | 8/2008 |
| JP | 2012-092820 | | 5/2012 |
| JP | 2012-092821 | | 5/2012 |

OTHER PUBLICATIONS

U.S. Appl. No. 13/628,521, filed Sep. 27, 2012, Sakashita et al.
U.S. Appl. No. 13/628,672, filed Sep. 27, 2012, Sakashita et al.
International Search Report and Written Opinion dated May 10, 2011.

* cited by examiner

HONEYCOMB STRUCTURE

TECHNICAL FIELD

The present invention relates to a honeycomb structure, and more particularly, it relates to a honeycomb structure which is a catalyst carrier, also functions as a heater by applying a voltage, and can suppress a bias of a temperature distribution when applying the voltage.

BACKGROUND ART

Heretofore, a honeycomb structure made of cordierite and including a loaded catalyst has been used in the treatment of harmful substances in an exhaust gas discharged from a car engine. Moreover, it is also known that a honeycomb structure formed by using a sintered silicon carbide body is used in the purification of the exhaust gas (e.g., see Patent Document 1).

When the exhaust gas is treated by the catalyst loaded onto the honeycomb structure, it is necessary to raise a temperature of the catalyst to a predetermined temperature. However, at the start of the engine, the catalyst temperature is low, and hence there has been the problem that the exhaust gas is not sufficiently purified.

In consequence, there has been investigated a method of disposing a heater made of a metal on an upstream side of a honeycomb structure onto which a catalyst is loaded, to raise a temperature of an exhaust gas (e.g., see Patent Document 2).

PRIOR ART DOCUMENTS

Patent Documents

Patent Document 1: JP-4136319-B
Patent Document 2: JP-2931362-B

SUMMARY OF THE INVENTION

When the above heater is mounted on a car and used, a power source for use in an electric system of the car is used in common, and the power source having a high voltage of, for example, 200 V is used. However, the heater made of a metal has a low electric resistance, and hence when such a power source having the high voltage is used, there is the problem that a current excessively flows, and impairs a power source circuit sometimes.

Moreover, when the heater is made of the metal, a catalyst is not easily loaded, even if a honeycomb structure is processed. Therefore, it has been difficult to integrate the heater and the catalyst.

The present invention has been developed in view of the above-mentioned problems, and an object thereof is to provide a honeycomb structure which is a catalyst carrier, also functions as a heater by applying a voltage, and can suppress a bias of a temperature distribution when applying the voltage.

To achieve the above-mentioned object, the present invention provides the following honeycomb structure.

[1] A honeycomb structure comprising: a tubular honeycomb structure section including porous partition walls which partition and form a plurality of cells extending from one end surface to the other end surface to become through channels of a fluid, and an outer peripheral wall positioned in an outermost periphery; and a pair of electrode sections arranged on a side surface of the honeycomb structure section, wherein an electrical resistivity of the honeycomb structure section is from 1 to 200 Ωcm, each of the pair of electrode sections is formed into a band-like shape extending in a cell extending direction of the honeycomb structure section, the one electrode section in the pair of electrode sections is disposed on an opposite side of the other electrode section in the pair of electrode sections via the center of the honeycomb structure section in a cross section which is perpendicular to the cell extending direction, an angle which is 0.5 time as large as a central angle of each of the electrode sections is from 15 to 65° in the cross section which is perpendicular to the cell extending direction, each of the electrode sections is formed so as to become thinner from a center portion in a peripheral direction of the honeycomb structure section toward both ends in the peripheral direction in the cross section which is perpendicular to the cell extending direction, and an outer peripheral shape is a round shape in the cross section which is perpendicular to the cell extending direction.

[2] The honeycomb structure according to [1], wherein each of the electrode sections is constituted of the center portion in the peripheral direction of the honeycomb structure section, and expanded portions positioned on both sides of the center portion in the peripheral direction in the cross section which is perpendicular to the cell extending direction, and the electrical resistivity of the center portion of the electrode section is smaller than that of each of the expanded portions of the electrode section.

[3] The honeycomb structure according to [2], wherein the electrical resistivity of the center portion of the electrode section is from 0.2 to 10 Ωcm.

[4] The honeycomb structure according to [2] or [3], wherein the electrical resistivity of the center portion of the electrode section is from 1 to 60% of that of the expanded portion of the electrode section.

[5] The honeycomb structure according to any one of [2] to [4], wherein a thickness of the thickest portion of the center portion of the electrode section is from 0.2 to 5.0 mm.

[6] The honeycomb structure according to any one of [1] to [5], wherein in the cross section which is perpendicular to the cell extending direction, a shape of a boundary between the honeycomb structure section and the electrode section is a circular shape of a curvature radius which is larger than a curvature radius in the whole outer peripheral shape.

[7] The honeycomb structure according to [6], wherein in the cross section which is perpendicular to the cell extending direction, the shape of the boundary between the honeycomb structure section and the electrode section is a circular shape of a curvature radius which is from 1.5 to 5 times as large as the curvature radius in the whole outer peripheral shape.

[8] The honeycomb structure according to any one of [1] to [5], wherein in the cross section which is perpendicular to the cell extending direction, at least part of the shape of the boundary between the honeycomb structure section and the electrode section is a straight line.

[9] The honeycomb structure according to [1], wherein each of the electrode sections does not have any boundary portions and is continuously formed in the cross section which is perpendicular to the cell extending direction.

[10] The honeycomb structure according to [9], wherein the electrical resistivity of the electrode section is from 0.1 to 100 Ωcm.

[11] The honeycomb structure according to [9] or [10], wherein in the cross section which is perpendicular to the cell extending direction, at least part of a shape of a boundary between the honeycomb structure section and the electrode section is a straight line.

[12] The honeycomb structure according to any one of [1] to [11], wherein in the cross section which is perpendicular to the cell extending direction, the angle which is 0.5 time as large as the central angle of the center portion of the electrode section is from 20 to 40°.

[13] The honeycomb structure according to any one of [1] to [12], wherein at a center position of the center portion of each of the electrode sections in the cell extending direction, there is disposed an electrode terminal protruding portion to which an electric wiring is fastened.

EFFECT OF THE INVENTION

In the honeycomb structure of the present invention, the electrical resistivity of the honeycomb structure section is from 1 to 200 Ωcm, and hence even when a current is allowed to flow by using a power source having a high voltage, the current does not excessively flow, whereby it is possible to suitably use the honeycomb structure as a heater. Moreover, "each of the pair of electrode sections is formed into the band-like shape extending in the cell extending direction of the honeycomb structure section, the one electrode section in the pair of electrode sections is disposed on the opposite side of the other electrode section in the pair of electrode sections via the center of the honeycomb structure section in the cross section which is perpendicular to the cell extending direction, the angle which is 0.5 time as large as the central angle of each of the electrode sections is from 15 to 65° in the cross section which is perpendicular to the cell extending direction", and hence it is possible to suppress a bias of a temperature distribution when applying the voltage.

Furthermore, "each of the electrode sections is formed so as to become thinner from the center portion in the peripheral direction toward both the ends in the peripheral direction in the cross section which is perpendicular to the cell extending direction", and hence it is possible to further suppress the bias of the temperature distribution when applying the voltage.

In addition, even when "each of the electrode sections is constituted of the center portion in the peripheral direction, and expanded portions positioned on both sides of the center portion in the peripheral direction (the peripheral direction of the honeycomb structure section) in the cross section which is perpendicular to the cell extending direction and the electrical resistivity of the center portion of the electrode section is smaller than that of each of the expanded portions of the electrode section", it is possible to further suppress the bias of the temperature distribution of the honeycomb structure when applying the voltage.

Furthermore, "in the cross section which is perpendicular to the cell extending direction, the outer peripheral shape is the round shape", and hence even when the honeycomb structure is contained in a can member and receives a pressure from the outside in the can member, it is possible to prevent the breakage of the honeycomb structure or the like. Additionally, the honeycomb structure usually contained (pressed) in the can member is used in the treatment of an exhaust gas of a car or the like. Moreover, it is possible to further effectively suppress the bias of the current flowing through the honeycomb structure when applying the voltage, whereby it is possible to further suppress the bias of the temperature distribution of the honeycomb structure.

MODE FOR CARRYING OUT THE INVENTION

Next, modes for carrying out the present invention will be described in detail with reference to the drawings, but it should be understood that the present invention is not limited to the following embodiments, and design change, improvement and the like are suitably added based on the ordinary knowledge of a person skilled in the art without departing from the scope of the present invention.

(1) Honeycomb Structure

Figure 1:
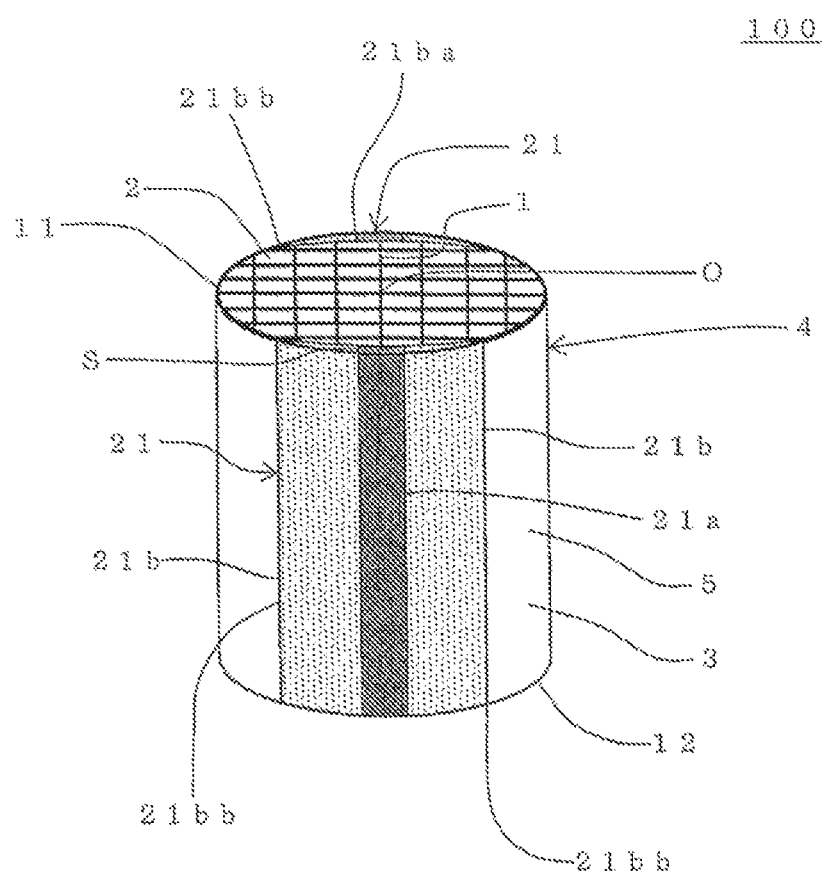
FIG. 1 is a perspective view schematically showing one embodiment of a honeycomb structure of the present invention.
Figure 2:
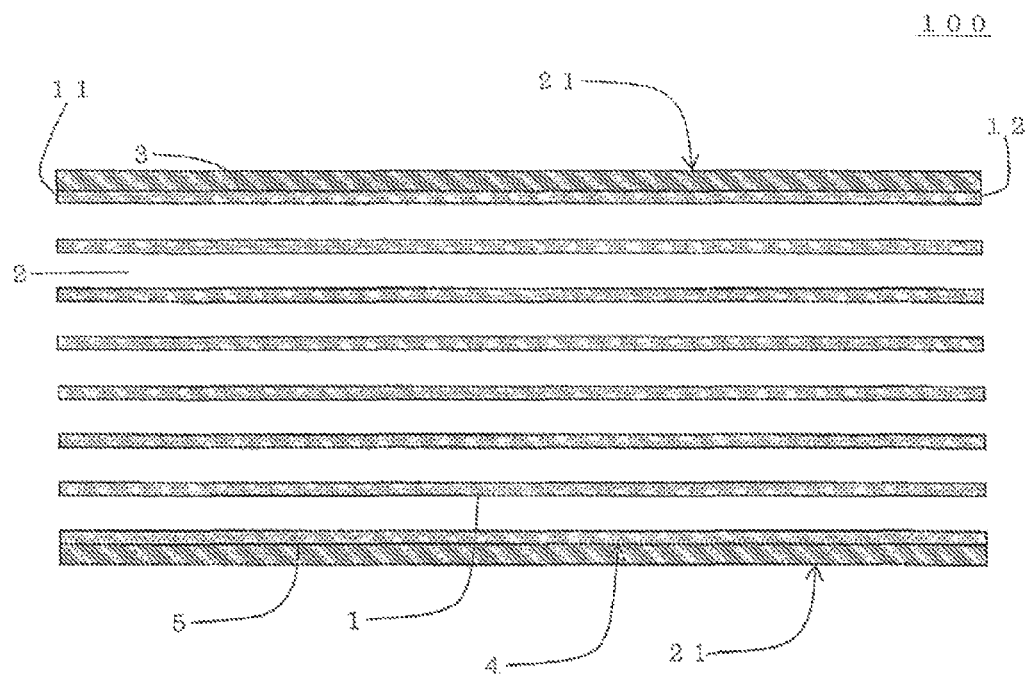
FIG. 2 is a schematic view showing a cross section which is parallel to a cell extending direction in the one embodiment of the honeycomb structure of the present invention.
Figure 3:
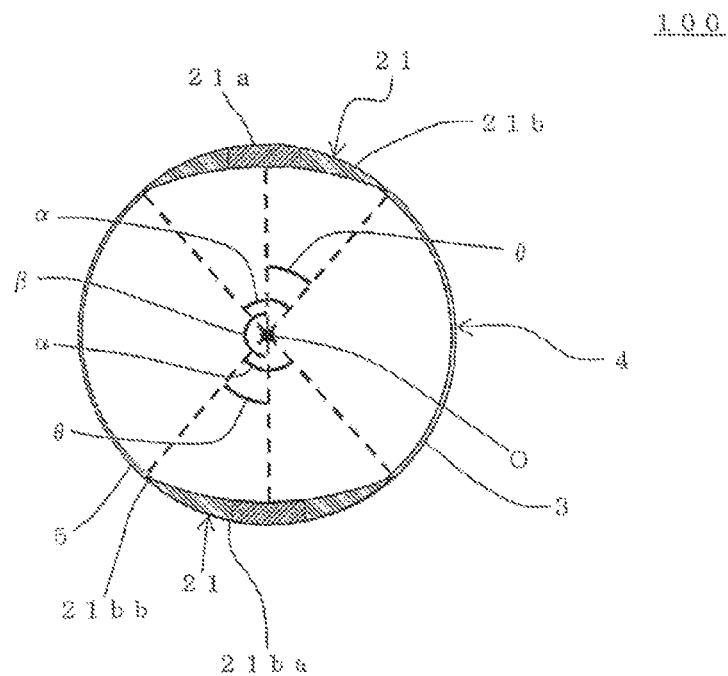
FIG. 3 is a schematic view showing a cross section which is perpendicular to the cell extending direction in the one embodiment of the honeycomb structure of the present invention.

As shown in FIG. 1 to FIG. 3, one embodiment of a honeycomb structure of the present invention comprises a tubular honeycomb structure section 4 including porous partition walls 1 which partition and form a plurality of cells 2 extending from one end surface 11 to the other end surface 12 to become through channels of a fluid, and an outer peripheral wall 3 positioned in an outermost periphery; and a pair of electrode sections 21 and 21 arranged on a side surface 5 of the honeycomb structure section 4. An electrical resistivity of the honeycomb structure section 4 is from 1 to 200 Ωcm, each of the pair of electrode sections 21 and 21 is formed into a band-like shape extending in an extending direction of the cells 2 of the honeycomb structure section 4, the one electrode section 21 in the pair of electrode sections 21 and 21 is disposed on an opposite side of the other electrode section 21 in the pair of electrode sections 21 and 21 via the center O of the honeycomb structure section 4 in a cross section which is perpendicular to the extending direction of the cells 2 (in the cross section which is perpendicular to a central axis), an angle which is 0.5 time as large as a central angle α of each of the electrode sections 21 and 21 is from 15 to 65° in the cross section which is perpendicular to the extending direction of the cells 2, and each of the electrode sections 21 and 21 is formed so as to become thinner from a center portion 21a in a peripheral direction toward both ends (the side edges) 21bb and 21bb in the peripheral direction in the cross section which is perpendicular to the extending direction of the cells 2. An outer peripheral shape is a round shape in the cross section which is perpendicular to the extending direction of the cells 2. FIG. 1 is a perspective view schematically showing the one embodiment of the honeycomb structure of the present invention. FIG. 2 is a schematic view showing a cross section which is parallel to the cell extending direction in the one embodiment of the honeycomb structure of the present invention. FIG. 3 is a schematic view showing a cross section which is perpendicular to the cell extending direction in the one embodiment of the honeycomb structure of the present invention. It is to be noted that in FIG. 3, the partition walls are omitted.

Thus, in a honeycomb structure 100 of the present embodiment, the electrical resistivity of the honeycomb structure section 4 is from 1 to 200 Ωcm, and hence even when a current is allowed to flow by using a power source having a high voltage, the current does not excessively flow, whereby it is possible to suitably use the honeycomb structure as a heater. Moreover, "each of the pair of electrode sections 21 and 21 is formed into a band-like shape extending in the extending direction of the cells 2 of the honeycomb structure section 4, the one electrode section 21 in the pair of electrode sections 21 and 21 is disposed on an opposite side of the other electrode section 21 in the pair of electrode sections 21 and 21 via the center of the honeycomb structure section 4 in a cross section which is perpendicular to the extending direction of the cells 2, an angle which is 0.5 time as large as a central angle α of each of the electrode sections 21 and 21 (the angle θ of 0.5 time the central angle α) is from 15 to 65° in the cross section which is perpendicular to the extending direction of the cells 2", and hence it is possible to suppress a bias of a temperature distribution of the honeycomb structure section 4 when applying the voltage across the pair of electrode sections 21 and 21.

Furthermore, "each of the electrode sections 21 and 21 is formed so as to become thinner from the center portion 21a in a peripheral direction toward both ends (the side edges) 21bb and 21bb in the peripheral direction in the cross section which is perpendicular to the extending direction of the cells 2", and hence it is possible to further suppress the bias of the temperature distribution when applying the voltage. In addition, "in the cross section which is perpendicular to the extending direction of the cells 2, the outer peripheral shape is the round shape", and hence even when the honeycomb structure is contained in a can member and receives a pressure from the outside in the can member, it is possible to prevent the breakage of the honeycomb structure or the like. Moreover, it is possible to further effectively suppress the bias of the current flowing through the honeycomb structure 100 when applying the voltage, whereby it is possible to further suppress the bias of the temperature distribution of the whole honeycomb structure 100.

Here, when "the one electrode section 21 in the pair of electrode sections 21 and 21 is disposed on the opposite side of the other electrode section 21 in the pair of electrode sections 21 and 21 via the center O of the honeycomb structure section 4 in the cross section which is perpendicular to the extending direction of the cells 2", it is meant that the pair of electrode sections 21 and 21 are arranged in the honeycomb structure section 4 so as to have such a positional relation that in the cross section which is perpendicular to the extending direction of the cells 2, an angle β (the angle around "the center O") formed by "a line segment connecting the center point of the one electrode section 21 (the center point in "the peripheral direction of the honeycomb structure section 4") and the center O of the honeycomb structure section 4" and "a line segment connecting the center point of the other electrode section 21 (the center point in "the peripheral direction of the honeycomb structure section 4") and the center O of the honeycomb structure section 4" is in a range of 170 to 190°. Moreover, as shown in FIG. 3, "the central angle α of the electrode section 21" is the angle formed by two line segments connecting both the ends of the electrode section 21 and the center O of the honeycomb structure section 4 in the cross section which is perpendicular to the cell extending direction (the inner angle of the portion of the center O in a shape (e.g., the fan-like shape) formed by "the electrode section 21", "the line segment connecting one end portion of the electrode section 21 and the center O", and "the line segment connecting the other end portion of the electrode section 21 and the center O" in the cross section which is perpendicular to the cell extending direction). Moreover, "the center portion of the electrode section 21 in the peripheral direction in the cross section which is perpendicular to the cell extending direction" means the center portion of the electrode section 21 in "the peripheral direction of the honeycomb structure section 4" in the cross section of the honeycomb structure which is perpendicular to the cell extending direction. Furthermore, "the center portion of the electrode section 21" may be "one center point of the electrode section 21 in the peripheral direction" in the cross section which is perpendicular to the cell extending direction, or "a portion positioned at the center of the electrode section 21 in the peripheral direction and having a width in the peripheral direction" in the cross section which is perpendicular to the cell extending direction. Moreover, when "the portion having the width in the peripheral direction is positioned at the center in the peripheral direction", it is meant that "the portion having the width in the peripheral direction" is disposed at a position which overlaps with the center point of the electrode section 21 in the peripheral direction. In the honeycomb structure of the present embodiment, the center point of the electrode section 21 in the peripheral direction preferably coincides with the center point of "the center portion" of the electrode section 21 in the peripheral direction.

Moreover, when "the outer peripheral shape of the honeycomb structure 100 is the round shape in the cross section which is perpendicular to the extending direction of the cells 2", it is meant that the outer peripheral shape of the structure (the honeycomb structure 100) where the honeycomb structure section 4 and the pair of electrode sections 21 and 21 are combined in the cross section which is perpendicular to the extending direction of the cells 2 is the round shape. That is, it is meant that the whole shape of the structure including the honeycomb structure section 4 provided with the pair of electrode sections 21 and 21 is a cylindrical shape. For example, when each of the pair of electrode sections 21 and 21 is configured to "extend over both the end portions of the honeycomb structure section 4 (a length of the electrode section in the cell extending direction is the same as a length of the honeycomb structure section in the cell extending direction)", it is meant that the whole outer peripheral shape including the honeycomb structure section 4 and the pair of electrode sections 21 and 21 is the round shape in "the cross section which is perpendicular to the extending direction of the cells 2". Moreover, when the length of each of the pair of electrode sections 21 and 21 in the extending direction of the cells 2 is smaller than the length of the honeycomb structure section 4 in the extending direction of the cells 2 (in a state where the end portion of the electrode section in the cell extending direction does not come in contact with (does not reach) the end portion of the honeycomb structure section in the cell extending direction), it is meant that the whole outer peripheral shape including the honeycomb structure section 4 and the pair of electrode sections 21 and 21 is the round shape in "the cross section which is perpendicular to the extending direction of the cells 2 and includes the pair of electrode sections 21 and 21", and the outer peripheral shape of the honeycomb structure section 4 is the round shape in "the cross section which is perpendicular to the extending direction of the cells 2 and does not include the pair of electrode sections 21 and 21".

In the honeycomb structure 100 of the present embodiment, as shown in FIG. 1 to FIG. 3, each of the electrode sections 21 and 21 is constituted of the center portion 21a in the peripheral direction of the honeycomb structure section 4, and expanded portions 21b and 21b positioned on both sides of the center portion 21a in the peripheral direction in the cross section which is perpendicular to the cell extending direction, and the electrical resistivity of the center portion 21a of the electrode section 21 is smaller than the electrical resistivity of the expanded portion 21b of the electrode section 21. Since the honeycomb structure 100 of the present embodiment has such a constitution, it is possible to further suppress the bias of the temperature distribution when applying the voltage. In particular, since the electrical resistivity of the center portion 21a of the electrode section 21 is smaller than the electrical resistivity of the expanded portion 21b of the electrode section 21, it is possible to effectively suppress the bias of the temperature distribution in the extending direction of the cells 2 of the honeycomb structure section 4. In consequence, it is possible to suppress the bias of the temperature distribution of the whole honeycomb structure 100. Additionally, in the honeycomb structure 100 of the present embodiment, the center portion 21a of the electrode section 21 is "the portion positioned at the center of the electrode section in the peripheral direction and having the width in the peripheral direction" in the cross section which is perpendicular to the cell extending direction. Here, when "the expanded portions 21b are positioned on both the sides of the center portion 21a in the peripheral direction in the cross section which is perpendicular to the extending direction of the cells 2", the expanded portions 21b are positioned on "one end portion side and the other end portion side" of the center portion 21a in "the peripheral direction of the honeycomb structure section 4".

In the honeycomb structure 100 of the present embodiment, a material of the partition walls 1 and the outer peripheral wall 3 preferably contains a silicon-silicon carbide composite material or silicon carbide as a main component, and the material is further preferably the silicon-silicon carbide composite material or silicon carbide. When "the material of the partition walls 1 and the outer peripheral wall 3 contains silicon carbide particles and silicon as main components", it is meant that the partition walls 1 and the outer peripheral wall 3 contain 90 mass % of the silicon carbide particles and silicon or more in the whole material. When such a material is used, the electrical resistivity of the honeycomb structure section can be from 1 to 200 Ωcm. Here, the silicon-silicon carbide composite material contains the silicon carbide particles as aggregates, and silicon as a binder which binds the silicon carbide particles, and the plurality of silicon carbide particles are preferably bound by silicon so as to form pores among the silicon carbide particles. Moreover, silicon carbide is obtained by sintering the silicon carbide.

In the honeycomb structure 100 of the present embodiment, as shown in FIG. 1 to FIG. 3, the pair of electrode sections 21 and 21 are arranged on the side surface 5 of the honeycomb structure section 4. The honeycomb structure 100 of the present embodiment generates heat by applying the voltage across the pair of electrode sections 21 and 21. The voltage to be applied is preferably from 12 to 900 V, and further preferably from 64 to 600 V.

As shown in FIG. 1 to FIG. 3, each of the pair of electrode sections 21 and 21 is formed into "the band-like shape" extending in the extending direction of the cells 2 of the honeycomb structure section 4. Moreover, the one electrode section 21 in the pair of electrode sections 21 and 21 is disposed on the opposite side of the other electrode section 21 in the pair of electrode sections 21 and 21 via the center portion O of the honeycomb structure section 4 in the cross section which is perpendicular to the extending direction of the cells 2. Furthermore, the angle which is 0.5 time as large as the central angle α of each of the electrode sections 21 and 21 (the angle θ of 0.5 time the central angle α) is from 15 to 65° in the cross section which is perpendicular to the extending direction of the cells 2. Thus, the electrode section 21 is formed into the band-like shape, a longitudinal direction of the band-like electrode section 21 extends in the extending direction of the cells 2 of the honeycomb structure section 4, the pair of electrode sections 21 and 21 are arranged on the opposite sides via the center portion O of the honeycomb structure section 4, and the angle θ of 0.5 time the central angle α of each of the electrode sections 21 and 21 is from 15 to 65° in the cross section which is perpendicular to the extending direction of the cells 2. Therefore, when the voltage is applied across the pair of electrode sections 21 and 21, it is possible to suppress the bias of the current flowing through the honeycomb structure section 4, whereby it is possible to suppress the bias of the heat generation in the honeycomb structure section 4. As shown in FIG. 3, "the central angle α of the electrode section 21" is the angle formed by two line segments connecting both the ends of the electrode section 21 and the center O of the honeycomb structure section 4 in the cross section which is perpendicular to the extending direction of the cells 2 (the inner angle of the portion of the center O in a shape (e.g., the fan-like shape) formed by "the electrode section 21", "the line segment connecting one end portion of the electrode section 21 and the center O", and "the line segment connecting the other end portion of the electrode section 21 and the center O" in the cross section which is perpendicular to the extending direction of the cells 2).

In the cross section which is perpendicular to the extending direction of the cells 2, an upper limit value of "the angle θ of 0.5 time the central angle α" of each of the electrode sections 21 and 21 is preferably 60°, and further preferably 55°. Moreover, in the cross section which is perpendicular to the extending direction of the cells 2, a lower limit value of "the angle θ of 0.5 time the central angle α" of each of the electrode sections 21 and 21 is preferably 20°, and further preferably 30°. In addition, "the angle θ of 0.5 time the central angle α" of the one electrode section 21 has a size which is preferably from 0.8 to 1.2 times, and further preferably 1.0 time (the same size) as large as "the angle θ of 0.5 time the central angle α" of the other electrode section 21. In consequence, when the voltage is applied across the pair of electrode sections 21 and 21, it is possible to suppress the bias of the current flowing through the honeycomb structure section 4, whereby it is possible to suppress the bias of the heat generation in the honeycomb structure section 4.

The electrode section 21 is constituted of the center portion 21a in the peripheral direction, and the expanded portions 21b and 21b positioned on both the sides of the center portion 21a in the peripheral direction in the cross section which is perpendicular to the extending direction of the cells 2, and the electrical resistivity of the center portion 21a of the electrode section 21 is preferably smaller than the electrical resistivity of the expanded portion 21b of the electrode section 21 (the center portion 21a comes in contact with the expanded portion 21b, and a boundary surface is formed in a contact portion). Thus, the electrical resistivity of the center portion 21a of the electrode section 21 is smaller than the electrical resistivity of the expanded portion 21b of the electrode section 21. Therefore, when the voltage is applied across the center portions 21a and 21a of the electrode sections 21 and 21, the current easily flows through the center portion 21a, and the bias of the flow of the current in the cell extending direction of the honeycomb structure decreases. In consequence, it is possible to effectively suppress the bias of the temperature distribution in the extending direction of the cells 2 of the honeycomb structure section 4. Moreover, when the current flows from the center portion 21a through the expanded portion 21b, it is possible to suppress the bias of the temperature distribution of the whole honeycomb structure 100.

The electrical resistivity of the center portion 21a of the electrode section 21 is preferably from 1 to 60%, and further preferably 15 to 50% of the electrical resistivity of the expanded portion 21b of the electrode section 21. When the electrical resistivity is smaller than 1%, the flow of the current in an outer peripheral direction of a cross section which is perpendicular to a central axis of the honeycomb structure section (the peripheral direction of the honeycomb structure section, and the direction from the center portion 21a toward the expanded portion 21b) decreases, and the bias of the temperature distribution increases sometimes. When the electrical resistivity is larger than 60%, the effect of suppressing the bias of the temperature distribution of the honeycomb structure 100 deteriorates sometimes. Moreover, the electrical resistivity of the center portion 21a is preferably from 0.2 to 10 Ωcm, and further preferably from 0.5 to 2.0 Ωcm. When the electrical resistivity is larger than 10 Ωcm, the effect of suppressing the bias of the temperature distribution of the honeycomb structure 100 deteriorates sometimes. The electrical resistivities of the center portion 21a and the expanded portion 21b are values measured by a two-terminal process. Moreover, the electrical resistivity of the electrode section 21 (the center portion 21a and the expanded portion 21b) is a value at 400° C.

In the honeycomb structure 100 of the present embodiment, as shown in FIG. 1 and FIG. 3, the electrode section 21 includes a portion which becomes a boundary (the boundary surface) S between the center portion 21a and the expanded portion 21b. Therefore, in the honeycomb structure 100 of the present embodiment, the respective electrode sections 21 and 21 include the portions S which become the boundaries, and are not continuously formed in the cross section which is perpendicular to the cell extending direction. The "boundary portion (the boundary surface) S" in the electrode section is a portion where the center portion 21a comes in contact with the expanded portion 21b. The electrode section comes in contact, but has a discontinuous structure in this portion (the boundary portion (the boundary surface) S). It can be considered that in the electrode section, a continuity (the integrity) of "material characteristics such as a material quality and a porosity" is discontinued in the boundary portion (the boundary surface) S (between the center portion 21a and the expanded portion 21b).

The expanded portion 21b of the electrode section 21 is formed so as to become thinner from an end portion 21ba which comes in contact with the center portion 21a toward a side edge 21bb which is an end portion (the peripheral edge) on the opposite side in the cross section which is perpendicular to the extending direction of the cells 2. When the voltage is applied across the electrode sections 21 and 21, the honeycomb structure 100 has the tendency that the current flows most through the vicinity of the side edge 21bb of the expanded portion 21b of the electrode section 21, to raise a temperature. However, when the expanded portion 21b is "formed so as to become thinner from the end portion 21ba which comes in contact with the center portion 21a toward the side edge 21bb in the cross section which is perpendicular to the extending direction of the cells 2", the temperature of "the vicinity of the side edge 21bb of the expanded portion 21b of the electrode section 21" of the honeycomb structure 100 is lowered, whereby it is possible to decrease the bias of the temperature distribution. In this way, the temperature of a high temperature portion of the honeycomb structure when applying the voltage is lowered, whereby the bias of the temperature distribution of the honeycomb structure decreases, and the temperature distribution becomes more even.

The expanded portion 21b is preferably formed so as to gradually become thinner continuously "from the end portion 21ba which comes in contact with the center portion 21a toward the side edge 21bb in the cross section which is perpendicular to the extending direction of the cells 2" as in the honeycomb structure 100 shown in FIG. 3.

In, the honeycomb structure 100 of the present embodiment, as shown in FIG. 3, in the cross section which is perpendicular to the extending direction of the cells 2, the outer peripheral shape is preferably the round shape, and in the cross section which is perpendicular to the extending direction of the cells 2, a shape of a boundary between the honeycomb structure section 4 and the electrode section 21 is preferably a circular shape having a radius which is larger than a radius of the whole (the whole honeycomb structure 100) outer peripheral shape (the round shape). Since the honeycomb structure 100 of the present embodiment is formed into such a shape, it is possible to further effectively suppress the bias of the current flowing through the honeycomb structure 100 when applying the voltage to the honeycomb structure 100 (across the pair of electrode sections), whereby it is possible to further suppress the bias of the temperature distribution of the whole honeycomb structure 100. "The outer peripheral shape of the honeycomb structure" means the outer peripheral shape of a structure where the honeycomb structure section is provided with the electrode sections, and means, for example, a shape which does not include any electrode terminal protruding portions when the electrode terminal protruding portions are arranged.

In the cross section which is perpendicular to the extending direction of the cells 2, the shape of the boundary between the honeycomb structure section 4 and the electrode section 21 is preferably "a circular shape of a curvature radius which is 1.5 to 5 times as large as a curvature radius of the whole (the whole honeycomb structure 100) outer peripheral shape", and further preferably "a circular shape of a curvature radius which is 2 to 4 times as large as a curvature radius of the whole (the whole honeycomb structure 100) outer peripheral shape". When the curvature radius is smaller than 1.5 times, the electrode section 21 becomes thin, and hence the effect of decreasing the bias of the temperature distribution of the honeycomb structure 100 deteriorates sometimes. When the curvature radius is larger than five times, the electrode section 21 becomes thick, and hence a catalyst loading area (the partition wall area) decreases sometimes, or a pressure loss when allowing an exhaust gas to flow increases sometimes.

Thus, in the honeycomb structure 100 of the present embodiment, the outer peripheral shape in the cross section which is perpendicular to the extending direction of the cells 2 is the round shape, and in the cross section which is perpendicular to the extending direction of the cells 2, the shape of the boundary between the honeycomb structure section 4 and the electrode section 21 is a circular shape of a radius which is larger than a radius of the whole (the whole honeycomb structure 100) outer peripheral shape (the round shape). Therefore, the expanded portion 21b of the electrode section 21 is formed so as to continuously gradually become thinner from the end portion 21ba which comes in contact with the center portion 21a toward the peripheral edge 21bb which is the opposite end portion in the cross section which is perpendicular to the extending direction of the cells 2. When the voltage is applied across the electrode sections 21 and 21, the honeycomb structure 100 has the tendency that the current flows most through the vicinity of the side edge 21bb of the expanded portion 21b of the electrode section 21, to raise a temperature. However, when the expanded portion 21b is "formed so as to become thinner from the end portion 21ba which comes in contact with the center portion 21a toward the side edge 21bb in the cross section which is perpendicular to the extending direction of the cells 2", the temperature of "the vicinity of the side edge 21bb of the expanded portion 21b of the electrode section 21" of the honeycomb structure 100 is lowered, whereby it is possible to decrease the bias of the temperature distribution. In this way, the temperature of a high temperature portion of the honeycomb structure when applying the voltage is lowered, whereby the bias of the temperature distribution of the honeycomb structure decreases, and the temperature distribution becomes more even.

In the honeycomb structure 100 of the present embodiment, in the cross section which is perpendicular to the extending direction of the cells 2, the shape of the boundary between the honeycomb structure section 4 and the electrode section 21 is the circular shape, but at least part of the shape of the boundary between the honeycomb structure section and the electrode section may be a straight line (linear). For example, a shape of a boundary between the center portion of the electrode section and the honeycomb structure section may be a straight line, and a shape of a boundary between the expanded portion of the electrode section and the honeycomb structure section may be a circular shape.

A thickness of the thickest portion of the center portion 21a of the electrode section 21 is preferably from 0.2 to 5.0 mm, and further preferably from 0.2 to 3.0 mm. When the thickness is smaller than 0.2 mm, the effect of the decreasing the bias of the temperature distribution when applying the voltage to the honeycomb structure deteriorates sometimes. When the thickness is larger than 5.0 mm, a temperature difference is easily made in an outer peripheral portion of the honeycomb structure, and large stress is generated sometimes in the honeycomb structure section, if there is a rapid temperature change during use of the honeycomb structure mounted on an exhaust system of an internal combustion engine.

As shown in FIG. 1 and FIG. 2, in the honeycomb structure 100 of the present embodiment, each of the pair of electrode sections 21 and 21 is formed into the band-like shape extending in the extending direction of the cells 2 of the honeycomb structure section 4 and "extending over both end portions (over both the end surfaces 11 and 12)". Thus, when the pair of electrode sections 21 and 21 are arranged over both the end portions of the honeycomb structure section 4, it is possible to more effectively suppress the bias of the current flowing through the honeycomb structure section 4 when applying the voltage across the pair of electrode sections 21 and 21, whereby it is possible to more effectively suppress the bias of the heat generation in the honeycomb structure section 4. Here, when "the electrode section 21 is formed (disposed) so as to extend over both the end portions of the honeycomb structure section 4", it is meant that one end portion of the electrode section 21 comes in contact with one end portion (one end surface) of the honeycomb structure section 4 and that the other end portion of the electrode section 21 comes in contact with the other end portion (the other end surface) of the honeycomb structure section 4.

Figure 8:
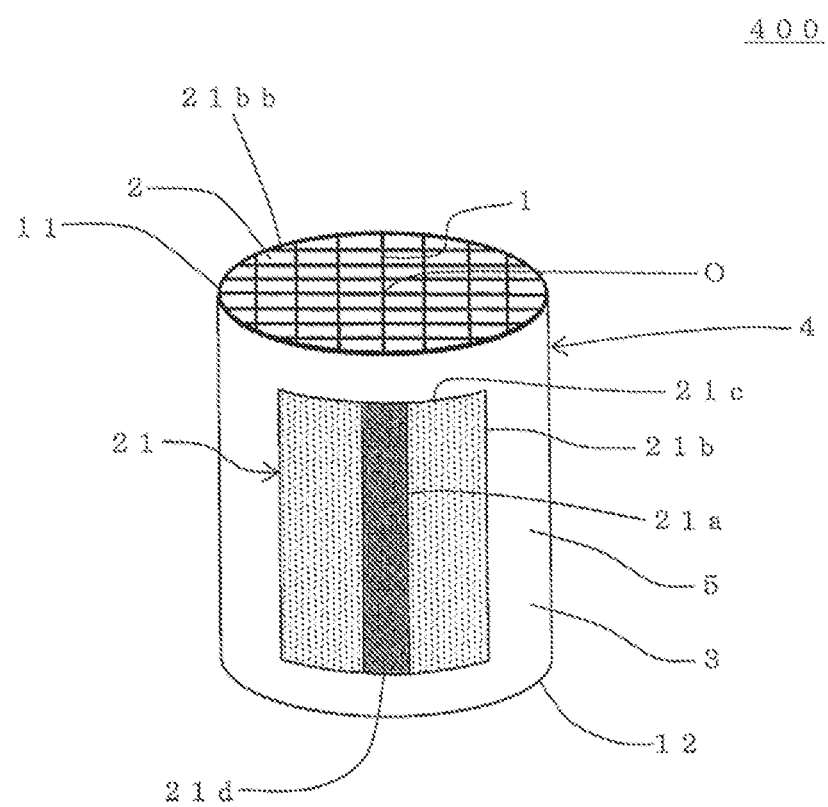
FIG. 8 is a perspective view schematically showing still another embodiment of the honeycomb structure of the present invention.
Figure 9:
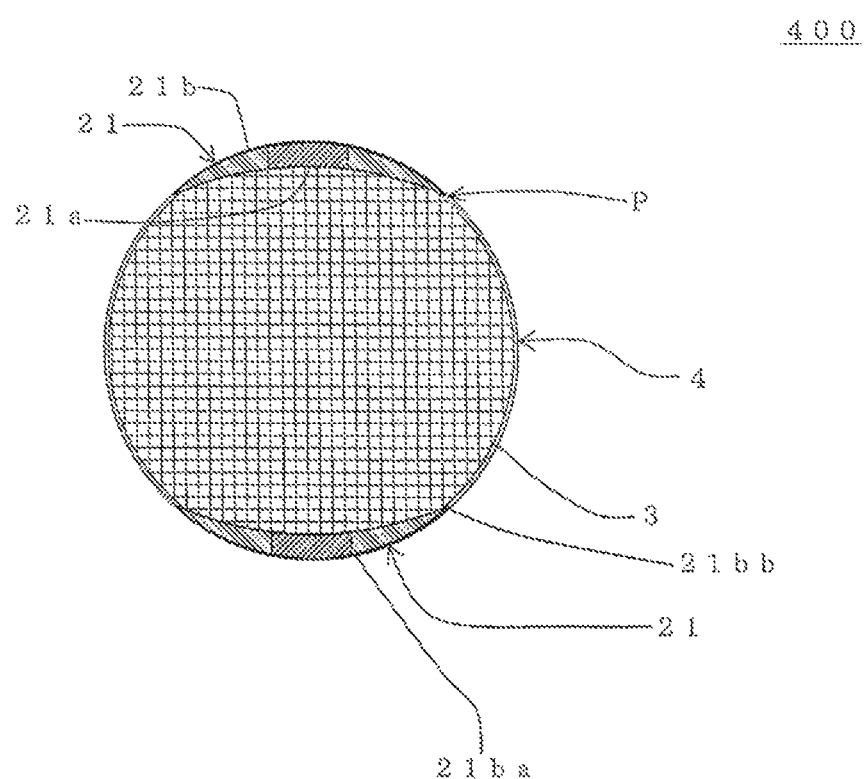
FIG. 9 is a schematic view showing a cross section which is perpendicular to a cell extending direction in the embodiment of the honeycomb structure of the present invention.

The pair of electrode sections 21 and 21 are preferably formed so as to extend over both the end portions of the honeycomb structure section 4 from the viewpoint that "the bias of the current flowing through the honeycomb structure section 4 is more effectively suppressed, thereby more effectively suppressing the bias of the heat generation in the honeycomb structure section 4" as described above. On the other hand, as shown in FIG. 8 and FIG. 9, both end portions 21c and 21d of the electrode section 21 in "the extending direction of the cells 2 of the honeycomb structure section 4" do not come in contact with (do not reach) both end portions (both the end surfaces 11 and 12) of the honeycomb structure section 4, and this state is also a preferable configuration. Moreover, the one end portion 21c of the electrode section 21 comes in contact with (reaches) the one end portion (the one end surface 11) of the honeycomb structure section 4, the other end portion 21d does not come in contact with (does not reach) the other end portion (the other end surface 12) of the honeycomb structure section 4, and this state is also a preferable configuration. When at least one end portion of the electrode section 21 does not come in contact with (does not reach) the end portion (the end surface) of the honeycomb structure section 4, it is possible to enhance a thermal shock resistance of the honeycomb structure. That is, each of the pair of electrode sections 21 and 21 preferably has the constitution where at least one end portion does not come in contact with (does not reach) the end portion (the end surface) of the honeycomb structure section 4 from the viewpoint of "enhancing the thermal shock resistance of the honeycomb structure". From the above, when it is considered that the viewpoint that "the bias of the current flowing through the honeycomb structure section 4 is more effectively suppressed, thereby more effectively suppressing the bias of the heat generation in the honeycomb structure section 4" is important, the pair of electrode sections 21 and 21 are preferably formed so as to extend over both the end portions of the honeycomb structure section 4. When it is considered that the viewpoint of "enhancing the thermal shock resistance of the honeycomb structure" is important, at least one end portion of each of the pair of electrode sections 21 and 21 preferably does not come in contact with (does not reach) the end portion (the end surface) of the honeycomb structure section 4.

Moreover, a distance from the one end portion 21c of the one electrode section 21 in the pair of electrode sections 21 and 21 to "the one end portion (the one end surface 11) of the honeycomb structure section 4" is preferably the same as a distance from the one end portion 21c of the remaining electrode section 21 in the pair of electrode sections 21 and 21 to "the one end portion (the one end surface 11) of the honeycomb structure section 4", but the distances may be different. Furthermore, a distance from the other end portion 21d of the one electrode section 21 in the pair of electrode sections 21 and 21 to "the other end portion (the other end surface 12) of the honeycomb structure section 4" is preferably the same as a distance from the other end portion 21d of the remaining electrode section 21 in the pair of electrode sections 21 and 21 to "the other end portion (the other end surface 12) of the honeycomb structure section 4", but the distances may be different. Additionally, the one end portion 21c of the electrode section 21 faces the one end portion (the one end surface 11) side of the honeycomb structure section 4, and the other end portion 21d of the electrode section 21 faces the other end portion (the other end surface 12) side of the honeycomb structure section 4. FIG. 8 is a perspective view schematically showing still another embodiment (a honeycomb structure 400) of the honeycomb structure of the present invention. FIG. 9 is a schematic view showing a cross section (the cross section including the electrode sections 21 and 21) which is parallel to a cell extending direction in the embodiment (the honeycomb structure 400) of the honeycomb structure of the present invention. Conditions of the honeycomb structure 400 of the present embodiment are preferably the same as conditions of the one embodiment (the honeycomb structure 100) of the honeycomb structure of the present invention, except that the end portion of the electrode section 21 does not come in contact with (does not reach) the end portion (the end surface) of the honeycomb structure section 4.

When at least one end portion of the electrode section 21 does not come in contact with (does not reach) the end portion (the end surface) of the honeycomb structure section 4, a distance between "the end portion of the electrode section 21" and "the end portion (the end surface) of the honeycomb structure section", which do not come in contact with each other, is preferably 50% or smaller, and further preferably 25% or smaller than a length of the honeycomb structure section 4 in the extending direction of the cells 2. When the distance is larger than 50%, the bias of the current flowing through the honeycomb structure section 4 is not easily suppressed sometimes, when applying the voltage across the pair of electrode sections 21 and 21.

In the honeycomb structure 100 of the present embodiment, when the angle of 0.5 time the central angle of the center portion 21a of the electrode section 21 is preferably from 5 to 25° in the cross section which is perpendicular to the cell extending direction. When the angle is smaller than 5°, the effect of decreasing the bias of the temperature distribution in the cell extending direction of the honeycomb structure when applying the voltage to the honeycomb structure deteriorates sometimes. When the angle is larger than 25°, the effect of lowering the temperature around the side edge 21bb of the expanded portion 21b of the electrode section 21 of the honeycomb structure 100 deteriorates sometimes.

In the honeycomb structure 100 of the present embodiment, when the center point of the electrode section 21 in the peripheral direction (the peripheral direction of the honeycomb structure section) is a position of "0°" and the side edge 21bb of the electrode section 21 is a position of "the angle θ of 0.5 time the central angle α of the electrode section 21" (the position of the angle θ) in the cross section which is perpendicular to the cell extending direction, a thickness of the electrode section 21 at a position of "0.5 time the angle θ (0.5θ)" (the position rotated as much as 0.5θ in the peripheral direction from "the position of 0°" toward "the position of the angle θ" (the midpoint between "the position of 0°" and "the position of the angle θ")) is preferably 95% or smaller, further preferably from 10 to 90%, and especially preferably from 15 to 85% of the thickness of the electrode section 21 at the center point in the peripheral direction. When the thickness is larger than 95%, the effect of suppressing the bias of the temperature distribution when applying the voltage to the honeycomb structure deteriorates sometimes.

Moreover, in the honeycomb structure 100 of the present embodiment, a thickness of the electrode section 21 at a position of "0.8 time the angle θ (0.8θ)" is preferably 80% or smaller, further preferably from 0.5 to 70%, and especially preferably from 1 to 65% of the thickness of the electrode section 21 at the center point in the peripheral direction, in the cross section which is perpendicular to the cell extending direction. When the thickness is larger than 80%, the effect of suppressing the bias of the temperature distribution when applying the voltage to the honeycomb structure deteriorates sometimes.

The honeycomb structure 100 of the present embodiment further preferably satisfies conditions of both the thickness of the electrode section at the above "position of 0.5θ" and the thickness of the electrode section at the above "position of 0.8θ".

The center portion 21a and the expanded portion 21b of the electrode section 21 preferably contain silicon carbide particles and silicon as main components, and are further preferably formed by using the silicon carbide particles and silicon as raw materials except usually contained impurities. Here, when "the silicon carbide particles and silicon are used as the main components", it is meant that a total mass of the silicon carbide particles and silicon is 90 mass % or larger than a mass of the whole electrode section. Thus, when the electrode section 21 contains the silicon carbide particles and silicon as the main components, the component of the electrode section 21 is the same as or close to the component of the honeycomb structure section 4 (when the material of the honeycomb structure section is silicon carbide), so that a thermal expansion coefficient of the electrode section 21 is the same as or close to that of the honeycomb structure section 4. Moreover, since the materials are the same or close, a joining strength between the electrode section 21 and the honeycomb structure section 4 also increases. Therefore, even when heat stress is applied to the honeycomb structure, the electrode section 21 can be prevented from peeling from the honeycomb structure section 4, or a joined portion between the electrode section 21 and the honeycomb structure section 4 can be prevented from being broken.

When the center portion 21a of the electrode section 21 contains the silicon carbide particles and silicon as the main components, a ratio of a mass of silicon contained in the center portion 21a of the electrode section 21 to "the total of the masses of the silicon carbide particles and silicon" contained in the center portion 21a of the electrode section 21 is preferably from 20 to 50 mass %, and further preferably from 30 to 45 mass %. In consequence, the electrical resistivity of the center portion 21a of the electrode section 21 can be in a range of 0.2 to 10 Ωcm. When the ratio is smaller than 20 mass %, the electrical resistivity increases, a strength to bind silicon carbide deteriorates, and the center portion 21a easily deteriorates sometimes.

When the expanded portion 21b of the electrode section 21 contains the silicon carbide particles and silicon as the main components, a ratio of a mass of silicon contained in the expanded portion 21b of the electrode section 21 to "the total of the masses of the silicon carbide particles and silicon" contained in the expanded portion 21b of the electrode section 21 is preferably from 20 to 40 mass %, and further preferably from 25 to 35 mass %. In consequence, the electrical resistivity of the expanded portion 21b of the electrode section 21 can be in a range of 0.2 to 100 Ωcm. When the ratio is smaller than 20 mass %, the electrical resistivity increases, the strength to bind silicon carbide deteriorates, and the expanded portion 21b easily deteriorates sometimes.

When the main components of the center portion 21a of the electrode section 21 are the silicon carbide particles and silicon, an average particle diameter of the silicon carbide particles contained in the center portion 21a is preferably from 10 to 60 μm, and further preferably from 20 to 60 μm. When the average particle diameter of the silicon carbide particles contained in the center portion 21a is in such a range, the electrical resistivity of the center portion 21a can be in a range of 0.2 to 10 Ωcm. When an average pore diameter of the silicon carbide particles contained in the center portion 21a is smaller than 10 μm, the electrical resistivity of the center portion 21a excessively increases sometimes. When the average pore diameter of the silicon carbide particles contained in the center portion 21a is larger than 60 μm, the strength of the center portion 21a decreases, and the portion easily breaks sometimes. The average particle diameter of the silicon carbide particles contained in the center portion 21a is a value measured by a laser diffraction process.

When the main components of the expanded portion 21b of the electrode section 21 are the silicon carbide particles and silicon, the average particle diameter of the silicon carbide particles contained in the expanded portion 21b is preferably from 10 to 60 μm, and further preferably from 20 to 60 μm. When the average particle diameter of the silicon carbide particles contained in the expanded portion 21b is in such a range, the electrical resistivity of the expanded portion 21b can be in a range of 0.2 to 100 Ωcm. When the average pore diameter of the silicon carbide particles contained in the expanded portion 21b is smaller than 10 μm, the electrical resistivity of the expanded portion 21b excessively increases sometimes. When the average pore diameter of the silicon carbide particles contained in the expanded portion 21b is larger than 60 μm, the strength of the expanded portion 21b decreases, and the portion easily breaks sometimes. The average particle diameter of the silicon carbide particles contained in the expanded portion 21b is a value measured by the laser diffraction process.

Porosities of the center portion 21a and the expanded portion 21b of the electrode section 21 are preferably from 30 to 45%, and further preferably from 30 to 40%. When the porosities of the center portion 21a and expanded portion 21b of the electrode section 21 are in such a range, a suitable electrical resistivity can be obtained. When the porosities of the center portion 21a and the expanded portion 21b of the electrode section 21 are smaller than 30%, the portions are deformed sometimes during manufacturing. When the porosities are larger than 45%, the electrical resistivity excessively increases sometimes. The porosities are values measured by a mercury porosimeter.

The average pore diameters of the center portion 21a and the expanded portion 21b of the electrode section 21 are preferably from 5 to 20 μm, and further preferably from 7 to 15 μm. When the average pore diameters of the center portion 21a and the expanded portion 21b of the electrode section 21 are in such a range, the suitable electrical resistivity can be obtained. When the average pore diameters of the center portion 21a and the expanded portion 21b of the electrode section 21 are smaller than 5 μm, the electrical resistivities of the center portion 21a and the expanded portion 21b excessively increase sometimes. When the average pore diameters are larger than 20 μm, the strengths of the center portion 21a and the expanded portion 21b of the electrode section 21 decrease, and the portions easily break sometimes. The average pore diameters are the values measured by the mercury porosimeter.

Partition wall thicknesses of the honeycomb structure 100 of the present embodiment are from 50 to 200 μm, and preferably from 70 to 130 μm. When the partition wall thicknesses are in such a range, it is possible to prevent a pressure loss from excessively increasing when allowing the exhaust gas to flow, even in a case where the honeycomb structure 100 is used as a catalyst carrier and a catalyst is loaded onto the structure. When the partition wall thicknesses are smaller than 50 μm, the strength of the honeycomb structure deteriorates sometimes. When the partition wall thicknesses are larger than 200 μm, the pressure loss when allowing the exhaust gas to flow increases sometimes, in the case where the honeycomb structure 100 is used as the catalyst carrier and the catalyst is loaded onto the structure.

In the honeycomb structure 100 of the present embodiment, a cell density is preferably from 40 to 150 cells/cm$^2$, and further preferably from 70 to 100 cells/cm$^2$. When the cell density is in such a range, a purification performance of the catalyst can be enhanced in a state where the pressure loss when allowing the exhaust gas to flow is decreased. When the cell density is smaller than 40 cells/cm$^2$, the catalyst loading area decreases sometimes. When the cell density is larger than 150 cells/cm$^2$, the pressure loss when allowing the exhaust gas to flow increases sometimes, in the case where the honeycomb structure 100 is used as the catalyst carrier and the catalyst is loaded onto the structure.

In the honeycomb structure 100 of the present embodiment, the average particle diameter of the silicon carbide particles (the aggregates) constituting the honeycomb structure section 4 is from 3 to 50 μm, and preferably from 3 to 40 μm. When the average particle diameter of the silicon carbide particles constituting the honeycomb structure section 4 is in such a range, the electrical resistivity of the honeycomb structure 100 can be from 1 to 200 Ωcm. When the average particle diameter of the silicon carbide particles is smaller than 3 μm, the electrical resistivity of the honeycomb structure 100 increases sometimes. When the average particle diameter of the silicon carbide particles is larger than 50 μm, the electrical resistivity of the honeycomb structure 100 decreases sometimes. Furthermore, when the average particle diameter of the silicon carbide particles is larger than 50 μm, an extruding die is clogged with a forming raw material sometimes at the extruding of a honeycomb formed body. The average particle diameter of the silicon carbide particles is the value measured by the laser diffraction process.

In the honeycomb structure 100 of the present embodiment, the electrical resistivity of the honeycomb structure section 4 is from 1 to 200 Ωcm, and preferably from 10 to 100 Ωcm. When the electrical resistivity is smaller than 1 Ωcm, the current excessively flows sometimes, for example, in a case where the honeycomb structure 100 is energized by a power source having a high voltage of 200 V or larger (the voltage is not limited to 200 V). When the electrical resistivity is larger than 200 Ωcm, the current does not easily flow, and the heat is not sufficiently generated sometimes, for example, in the case where the honeycomb structure 100 is energized by the power source having a high voltage of 200 V or larger (the voltage is not limited to 200 V). The electrical resistivity of the honeycomb structure section is a value measured by a four-terminal process. Moreover, the electrical resistivity of the honeycomb structure section 4 is the value at 400° C.

In the honeycomb structure 100 of the present embodiment, the electrical resistivity of the expanded portion 21b of the electrode section 21 is preferably smaller than the electrical resistivity of the honeycomb structure section 4. Furthermore, the electrical resistivity of the expanded portion 21b of the electrode section 21 is further preferably 20% or smaller, and especially preferably from 1 to 10% of the electrical resistivity of the honeycomb structure section 4. When the electrical resistivity of the expanded portion 21b of the electrode section 21 is 20% or smaller than the electrical resistivity of the honeycomb structure section 4, the expanded portion 21b of the electrode section 21 more effectively functions as an electrode.

In the honeycomb structure 100 of the present embodiment, when the material of the honeycomb structure section 4 is the silicon-silicon carbide composite material, a ratio of "the mass of silicon as the binder" contained in the honeycomb structure section 4 to the total of "the mass of the silicon carbide particles as the aggregates" contained in the honeycomb structure section 4 and "the mass of silicon as the binder" contained in the honeycomb structure section 4 is preferably from 10 to 40 mass %, and further preferably from 15 to 25 mass %. When the ratio is smaller than 10 mass %, the strength of the honeycomb structure deteriorates sometimes. When the ratio is larger than 40 mass %, a shape cannot be held at firing.

The porosities of the partition walls 1 of the honeycomb structure section 4 are preferably from 35 to 60%, and further preferably from 35 to 45%. When the porosities are smaller than 35%, the deformation at the firing increases sometimes. When the porosities are in excess of 60%, the strength of the honeycomb structure deteriorates sometimes. The porosities are the values measured by the mercury porosimeter.

The average pore diameter of the partition walls 1 of the honeycomb structure section 4 is preferably from 2 to 15 µm, and further preferably from 4 to 8 µm. When the average pore diameter is smaller than 2 µm, the electrical resistivity excessively increases sometimes. When the average pore diameter is larger than 15 µm, the electrical resistivity excessively decreases sometimes. The average pore diameter is the value measured by the mercury porosimeter.

Moreover, a thickness of the outer peripheral wall 3 constituting the outermost periphery of the honeycomb structure 100 of the present embodiment is preferably from 0.1 to 2 mm. When the thickness is smaller than 0.1 mm, the strength of the honeycomb structure 100 deteriorates sometimes. When the thickness is larger than 2 mm, an area of the partition walls onto which the catalyst is loaded decreases sometimes.

In the honeycomb structure 100 of the present embodiment, a shape of the cells 2 in the cross section which is perpendicular to the extending direction of the cells 2 is preferably a quadrangular shape, a hexagonal shape, an octagonal shape, or a combination thereof. When the cells are formed into such a shape, the pressure loss when allowing the exhaust gas to flow through the honeycomb structure 100 decreases, and the purification performance of the catalyst enhances.

As to the shape of the honeycomb structure of the present embodiment, the outer peripheral shape is the round shape in the cross section which is perpendicular to the cell extending direction. For example, a tubular shape (the cylindrical shape) having round end surfaces is preferable as in the honeycomb structure 100 shown in FIG. 1. When "the outer peripheral shape" of the honeycomb structure is "the round shape" in the cross section which is perpendicular to the cell extending direction, "the honeycomb structure section having the round outer peripheral shape" does not include "a shape provided with a thin electrode section" in the cross section which is perpendicular to the cell extending direction. That is, in the honeycomb structure where the honeycomb structure section having the round outer peripheral shape in the cross section which is perpendicular to the cell extending direction is provided with the thin electrode sections, the outer peripheral shape in the cross section which is perpendicular to the cell extending direction is not the round shape. Moreover, as to a size of the honeycomb structure, an area of the bottom surface is preferably from 2000 to 20000 mm$^2$, and further preferably from 4000 to 10000 mm$^2$. Moreover, a length of the honeycomb structure in a central axis direction is preferably from 50 to 200 mm, and further preferably from 75 to 150 mm.

An isostatic strength of the honeycomb structure 100 of the present embodiment is preferably 1 MPa or larger, and further preferably 3 MPa or larger. The isostatic strength preferably has a larger value, but when a material, a constitution and the like of the honeycomb structure 100 are taken into consideration, an upper limit is about 6 MPa. When the isostatic strength is smaller than 1 MPa, the honeycomb structure easily breaks sometimes during the use as the catalyst carrier or the like. The isostatic strength is a value measured by applying a hydrostatic pressure in water.

Figure 4:
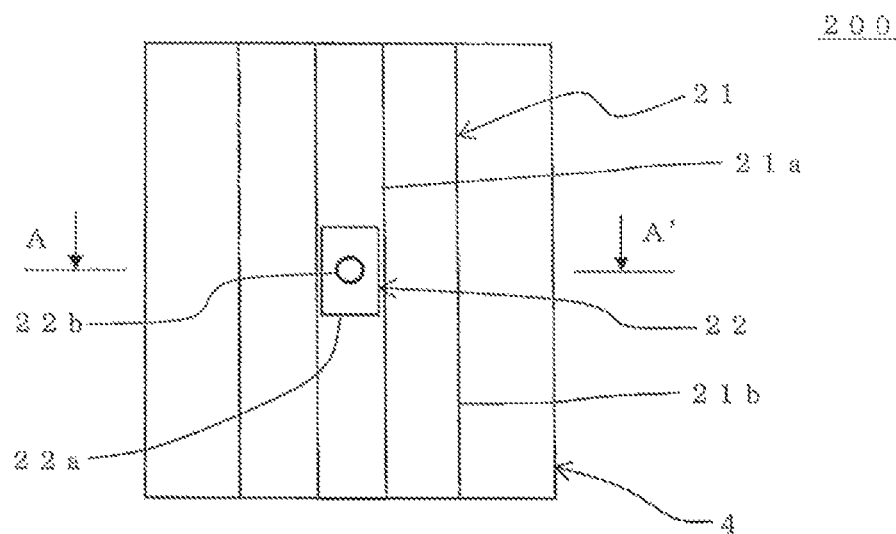
FIG. 4 is a front view schematically showing another embodiment of the honeycomb structure of the present invention.
Figure 5:
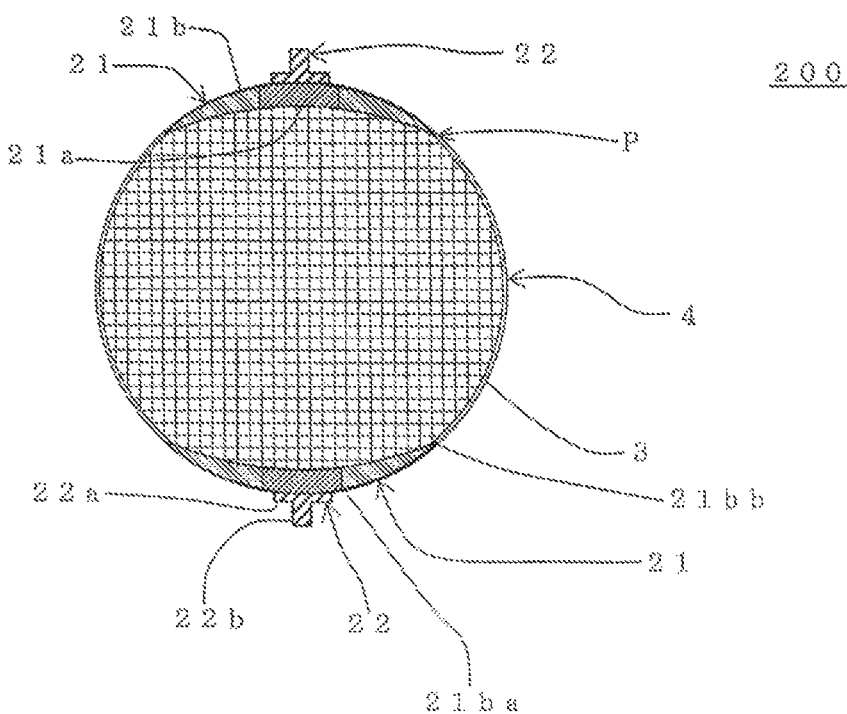
FIG. 5 is a schematic view showing a cross section cut along the A-A' line of FIG. 4.
Figure 6:
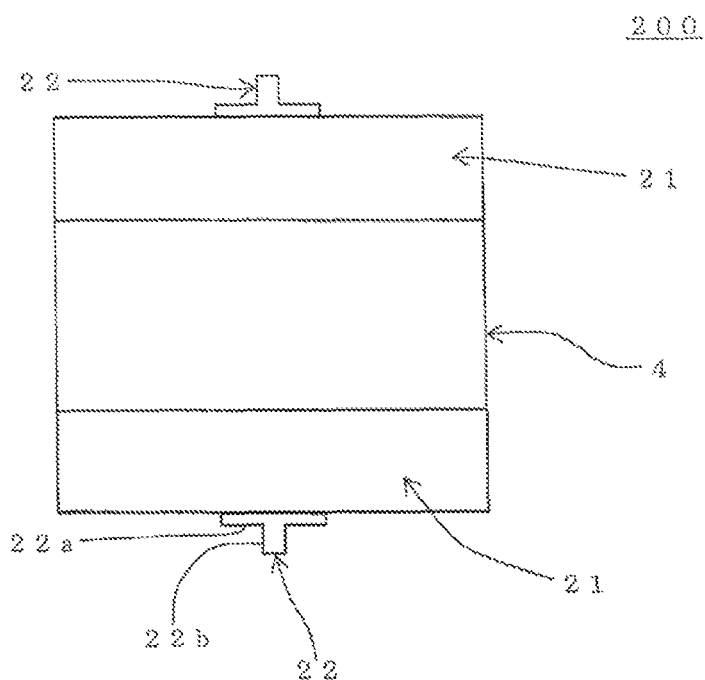
FIG. 6 is a side view schematically showing the embodiment of the honeycomb structure of the present invention.

Next, still another embodiment of the honeycomb structure of the present invention will be described. As shown in FIG. 4 to FIG. 6, a honeycomb structure 200 of the present embodiment has a constitution where electrode terminal protruding portions 22 and 22 to which electric wirings are fastened are arranged at center positions of center portions 21a and 21a of electrode sections 21 and 21 in a cell extending direction in the honeycomb structure 100 of the above present invention (see FIG. 1 to FIG. 3). The electrode terminal protruding portion 22 is a portion to which the wiring from a power source is connected, to apply a voltage across the electrode sections 21 and 21. Thus, when the electrode terminal protruding portions 22 and 22 to which the electric wirings are fastened are arranged at "the center positions" of the center portions 21a and 21a of the electrode sections 21 and 21 in the cell extending direction, whereby it is possible to further decrease a bias of a temperature distribution of a honeycomb structure section when applying the voltage to the electrode section. FIG. 4 is a front view schematically showing the embodiment of the honeycomb structure of the present invention. FIG. 5 is a schematic view showing a cross section cut along the A-A' line of FIG. 4. FIG. 6 is a side view schematically showing the embodiment of the honeycomb structure of the present invention.

Conditions of the honeycomb structure 200 of the present embodiment are preferably the same as the conditions of the one embodiment (the honeycomb structure 100) of the honeycomb structure of the present invention, except that "the electrode terminal protruding portions 22 and 22 to which the electric wirings are fastened are arranged at the center positions of the center portions 21a and 21a of the electrode sections 21 and 21 in the cell extending direction".

When the main components of the center portion 21a of the electrode section 21 are silicon carbide particles and silicon, the main components of the electrode terminal protruding portion 22 are preferably the silicon carbide particles and silicon. Thus, when the electrode terminal protruding portion 22 contains the silicon carbide particles and silicon as the main components, the components of the center portion 21a of the electrode section 21 are the same as (or close to) the components of the electrode terminal protruding portion 22, and hence a thermal expansion coefficient of the center portion 21a of the electrode section 21 has a value which is the same as (close to) that of a thermal expansion coefficient of the electrode terminal protruding portion 22. Moreover, since the material is the same (or close), a joining strength between the center portion 21a of the electrode section 21 and the electrode terminal protruding portion 22 increases. Therefore, even when heat stress is applied to the honeycomb structure, the electrode terminal protruding portion 22 can be prevented from peeling from the center portion 21a of the electrode section 21, or a joined portion between the electrode terminal protruding portion 22 and the center portion 21a of the electrode section 21 can be prevented from being broken. Here, when "the electrode terminal protruding portion 22 contains the silicon carbide particles and silicon as the main components", it is meant that a total mass of the silicon carbide particles and silicon contained in the electrode terminal protruding portion 22 is 90 mass % or larger than the whole mass.

There is not any special restriction on a shape of the electrode terminal protruding portion 22, and the protruding portion may be formed into any shape as long as the protruding portion is joined to the center portion 21a of the electrode section 21 and the electric wiring can be joined to the protruding portion. For example, as shown in FIG. 4 to FIG. 6, the electrode terminal protruding portion 22 preferably has a shape formed by disposing a columnar protruding portion 22b on a quadrangular plate-like substrate 22a. When the electrode terminal protruding portion is formed into such a shape, the electrode terminal protruding portion 22 can securely be joined to the center portion 21a of the electrode section 21 via the substrate 22a, and the electric wiring can firmly be joined to the protruding portion via the protruding portion 22b.

In the electrode terminal protruding portion 22, a thickness of the substrate 22a is preferably from 1 to 5 mm. When the substrate has such a thickness, the electrode terminal protruding portion 22 can securely be joined to the center portion 21a of the electrode section 21. When the thickness is smaller than 1 mm, the substrate 22a weakens, and the protruding portion 22b is easily detached from the substrate 22a sometimes. When the thickness is larger than 5 mm, a space to dispose the honeycomb structure becomes larger than necessary sometimes.

In the electrode terminal protruding portion 22, a length (the width) of the substrate 22a "in an outer peripheral direction of a cross section of a honeycomb structure section 4 which is perpendicular to a cell extending direction" is preferably from 10 to 50%, and further preferably from 20 to 40% of a length of the electrode section 21 "in the outer peripheral direction of the cross section of the honeycomb structure section 4 which is perpendicular to the cell extending direction". When the length is in such a range, the electrode terminal protruding portion 22 is not easily detached from the center portion 21a of the electrode section 21. When the length is smaller than 10%, the electrode terminal protruding portion 22 is easily detached from the center portion 21a of the electrode section 21. When the length is larger than 50%, a mass increases sometimes. In the electrode terminal protruding portion 22, the length of the substrate 22a in "the cell extending direction" is preferably from 5 to 30% of the length of the honeycomb structure section 4 in the cell extending direction. When the length of the substrate 22a in "the cell extending direction" is in such a range, a sufficient joining strength can be obtained. When the length of the substrate 22a in "the cell extending direction" is smaller than 5% of the length of the honeycomb structure section 4 in the cell extending direction, the protruding portion is easily detached from the center portion 21a of the electrode section 21 sometimes. Moreover, when the length is larger than 30%, the mass increases sometimes.

In the electrode terminal protruding portion 22, a thickness of the protruding portion 22b is preferably from 3 to 15 mm. When such a thickness is set, the electric wiring can securely be joined to the protruding portion 22b. When the thickness is smaller than 3 mm, the protruding portion 22b is easily broken sometimes. When the thickness is larger than 15 mm, the electric wiring is not easily connected sometimes. Moreover, a length of the protruding portion 22b is preferably from 3 to 20 mm. When such a length is set, the electric wiring can securely be joined to the protruding portion 22b. When the length is smaller than 3 mm, the electric wiring is not easily joined sometimes. When the length is larger than 20 mm, the protruding portion 22b is easily broken sometimes.

An electrical resistivity of the electrode terminal protruding portion 22 is preferably from 0.1 to 2.0 $\Omega$cm, and further preferably from 0.1 to 1.0 $\Omega$cm. When the electrical resistivity of the electrode terminal protruding portion 22 is in such a range, a current can efficiently be supplied to the electrode section 21 through the electrode terminal protruding portion 22 in a pipe through which a high-temperature exhaust gas flows. When the electrical resistivity of the electrode terminal protruding portion 22 is larger than 2.0 $\Omega$cm, the current does not easily flow, and hence the current is not easily supplied to the electrode section 21 sometimes.

A porosity of the electrode terminal protruding portion 22 is preferably from 30 to 45%, and further preferably from 30 to 40%. When the porosity of the electrode terminal protruding portion 22 is in such a range, a suitable electrical resistivity can be obtained. When the porosity of the electrode terminal protruding portion 22 is larger than 45%, the strength of the electrode terminal protruding portion 22 deteriorates sometimes, and especially when the strength of the protruding portion 22b deteriorates, the protruding portion 22b is easily broken sometimes. The porosity is the value measured by the mercury porosimeter.

An average pore diameter of the electrode terminal protruding portion 22 is preferably from 5 to 20 µm, and further preferably from 7 to 15 µm. When the average pore diameter of the electrode terminal protruding portion 22 is in such a range, the suitable electrical resistivity can be obtained. When the average pore diameter of the electrode terminal protruding portion 22 is larger than 20 µm, the strength of the electrode terminal protruding portion 22 deteriorates sometimes, and especially when the strength of the protruding portion 22b deteriorates, the protruding portion 22b is easily broken sometimes. The average pore diameter is the value measured by the mercury porosimeter.

When main components of the electrode terminal protruding portion 22 are silicon carbide particles and silicon, an average particle diameter of the silicon carbide particles contained in the electrode terminal protruding portion 22 is preferably from 10 to 60 µm, and further preferably from 20 to 60 µm. When the average particle diameter of the silicon carbide particles contained in the electrode terminal protruding portion 22 is in such a range, the electrical resistivity of the electrode terminal protruding portion 22 can be from 0.1 to 2.0 $\Omega$cm. When the average pore diameter of the silicon carbide particles contained in the electrode terminal protruding portion 22 is smaller than 10 µm, the electrical resistivity of the electrode terminal protruding portion 22 excessively increases sometimes. When the average pore diameter of the silicon carbide particles contained in the electrode terminal protruding portion 22 is larger than 60 µm, the electrical resistivity of the electrode terminal protruding portion 22 excessively decreases sometimes. The average particle diameter of the silicon carbide particles contained in the electrode terminal protruding portion 22 is the value measured by a laser diffraction process.

A ratio of a mass of silicon contained in the electrode terminal protruding portion 22 to "a total of masses of the silicon carbide particles and silicon" contained in the electrode terminal protruding portion 22 is preferably from 20 to 40 mass %, and further preferably from 25 to 35 mass %. When a ratio of the mass of silicon to the total of the masses of the silicon carbide particles and silicon contained in the electrode terminal protruding portion 22 is in such a range, an electrical resistivity of 0.1 to 2.0 Ωcm can easily be obtained. When the ratio of the mass of silicon to the total of the masses of the silicon carbide particles and silicon contained in the electrode terminal protruding portion 22 is smaller than 20 mass %, the electrical resistivity excessively increases sometimes. Moreover, when the ratio is larger than 40 mass %, the protruding portion is deformed sometimes during manufacturing.

Figure 10:
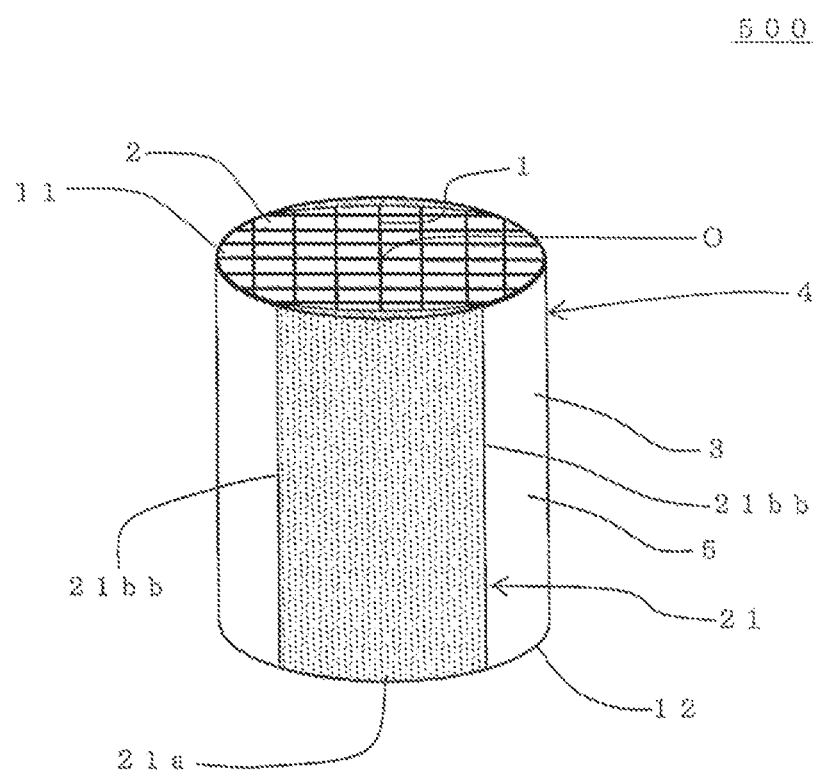
FIG. 10 is a perspective view schematically showing a further embodiment of the honeycomb structure of the present invention.
Figure 11:
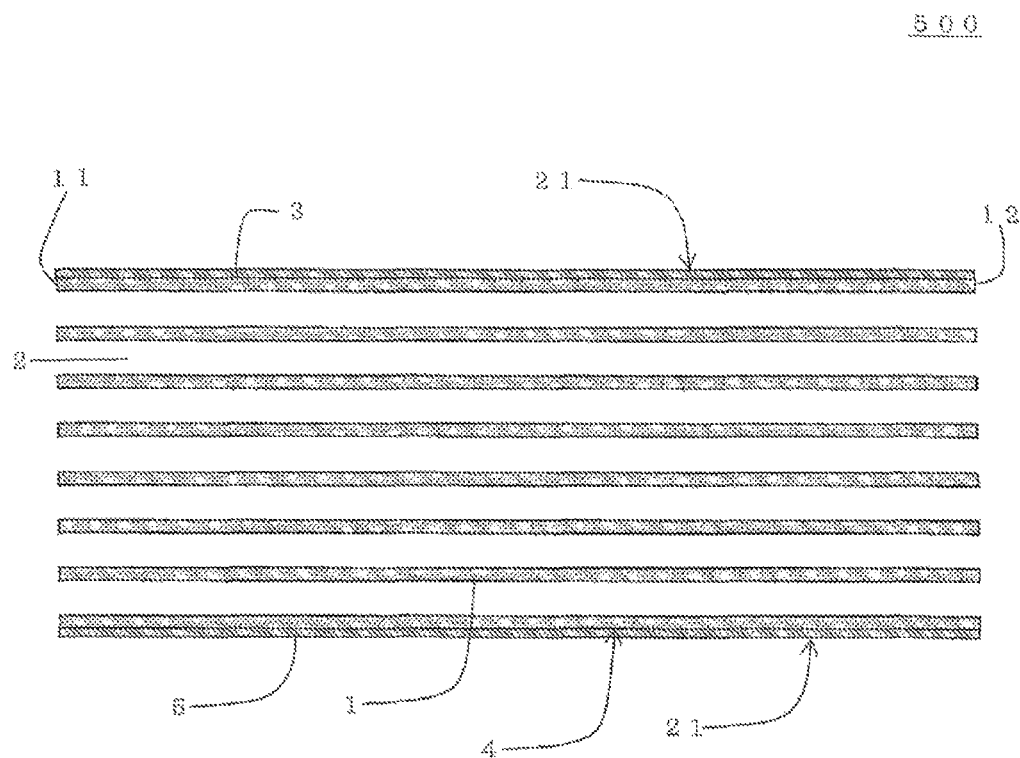
FIG. 11 is a schematic view showing a cross section which is parallel to the cell extending direction in the embodiment of the honeycomb structure of the present invention.
Figure 12:
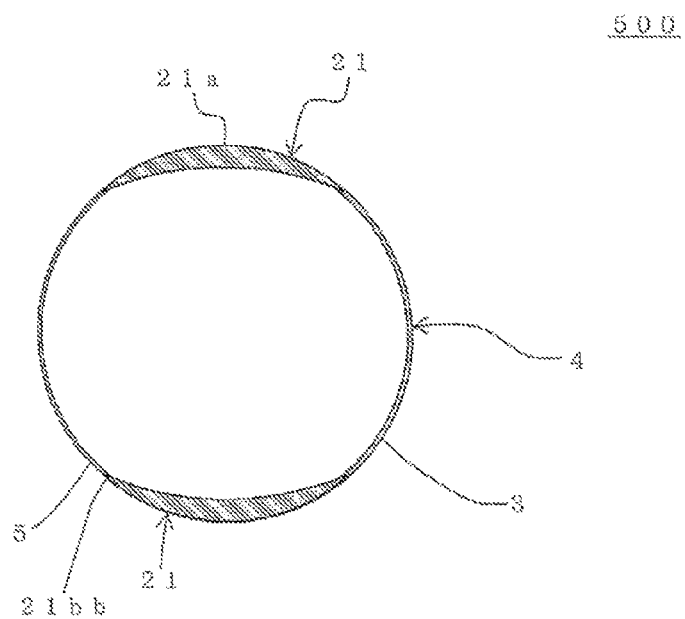
FIG. 12 is a schematic view showing a cross section which is perpendicular to the cell extending direction in the embodiment of the honeycomb structure of the present invention.

Next, a further embodiment of the honeycomb structure of the present invention will be described. As shown in FIG. 10 to FIG. 12, a honeycomb structure 500 of the present embodiment has a constitution where electrode sections 21 and 21 do not have any boundary portions and are continuously formed in a cross section which is perpendicular to a cell extending direction in the honeycomb structure 100 of the above present invention (see FIG. 1 to FIG. 3). That is, in the honeycomb structure 500 of the present embodiment, the electrode section 21 does not have "a portion which becomes a boundary" formed in a portion where a center portion 21a comes in contact with the expanded portion 21b (see FIG. 1). Here, when the electrode section 21 "does not have any boundary portions and is continuously formed", it is meant that the electrode section 21 does not have a discontinuous portion (the portion which becomes the boundary (the boundary surface)) where a continuity (the integrity) of a material quality is discontinued and that a homogeneous state is present in the electrode section. The discontinuous portion where the continuity (the integrity) of the material quality is discontinued is the boundary surface (the portion which becomes the boundary).

FIG. 10 is a perspective view schematically showing a still further embodiment of the honeycomb structure of the present invention. FIG. 11 is a schematic view showing a cross section which is parallel to a cell extending direction in the embodiment of the honeycomb structure of the present invention. FIG. 12 is a schematic view showing part of a cross section which is perpendicular to the cell extending direction in the embodiment of the honeycomb structure of the present invention. In FIG. 12, partition walls are omitted.

In the honeycomb structure 500 of the present embodiment, the respective electrode sections 21 and 21 do not have any boundary portions and are continuously formed in the cross section which is perpendicular to the cell extending direction, and hence a structure strength is advantageously high. Moreover, since the honeycomb structure 500 of the present embodiment has such an electrode section constitution, manufacturing steps during the preparation of the electrode section can be decreased, and manufacturing time can be shortened.

As shown in FIG. 12, each of the electrode sections 21 and 21 in the honeycomb structure 500 of the present embodiment becomes thinner from the center portion 21a in a peripheral direction toward both ends (both the peripheral edges) 21bb and 21bb in the peripheral direction in the cross section which is perpendicular to the cell extending direction. Moreover, each of the electrode sections 21 and 21 may gradually become thinner (continuously become thinner) from the center portion 21a in the peripheral direction toward both the ends (both the peripheral edges) 21bb and 21bb in the peripheral direction in the cross section which is perpendicular to the cell extending direction (see FIG. 12), or may become thinner stepwise (become thinner intermittently). Additionally, in the above case of "the constitution which becomes thinner stepwise", the shape of the boundary between the electrode section and the honeycomb structure section becomes a stepwise shape.

In the honeycomb structure 500 of the present embodiment, "the center portion 21a in the peripheral direction (the center portion)" of the electrode section 21 may be "one point at the center in the peripheral direction (the center point)" in the cross section which is perpendicular to the cell extending direction (the midpoint in the peripheral direction), or may be "a portion positioned at the center in the peripheral direction and having a width in the peripheral direction" in the cross section which is perpendicular to the cell extending direction. When "the center portion 21a in the peripheral direction (the center portion)" of the electrode section 21 is "the portion positioned at the center in the peripheral direction and having the width in the peripheral direction" in the cross section which is perpendicular to the cell extending direction, the center portion 21a may have a constant thickness (the whole center portion 21a has the same thickness), or may have another "shape having a changing thickness in accordance with the position". When the center portion has the width in the peripheral direction, the thickness of the center portion 21a is preferably the constant thickness (the whole center portion 21a has the same thickness). In the honeycomb structure 500 of the present embodiment, when the electrode section 21 is formed so as to become thinner gradually from the center point in the peripheral direction toward both the ends in the cross section which is perpendicular to the cell extending direction, the center portion of the electrode section 21 in the peripheral direction is the center point of the electrode section 21 in the peripheral direction. Moreover, when the electrode section 21 has, for example, the constant thickness in a predetermined region (the width) including the center point in the peripheral direction in the cross section which is perpendicular to the cell extending direction, the center portion of the electrode section 21 in the peripheral direction is in the region having the constant thickness (the width). In the honeycomb structure of the present embodiment, when "the center portion in the peripheral direction (the center portion)" of the electrode section is "the portion positioned at the center of the electrode section in the peripheral direction and having the width in the peripheral direction" in the cross section which is perpendicular to the cell extending direction, the center point of the electrode section in the peripheral direction preferably coincides with the center point of "the center portion" of the electrode section in the peripheral direction.

Figure 13:
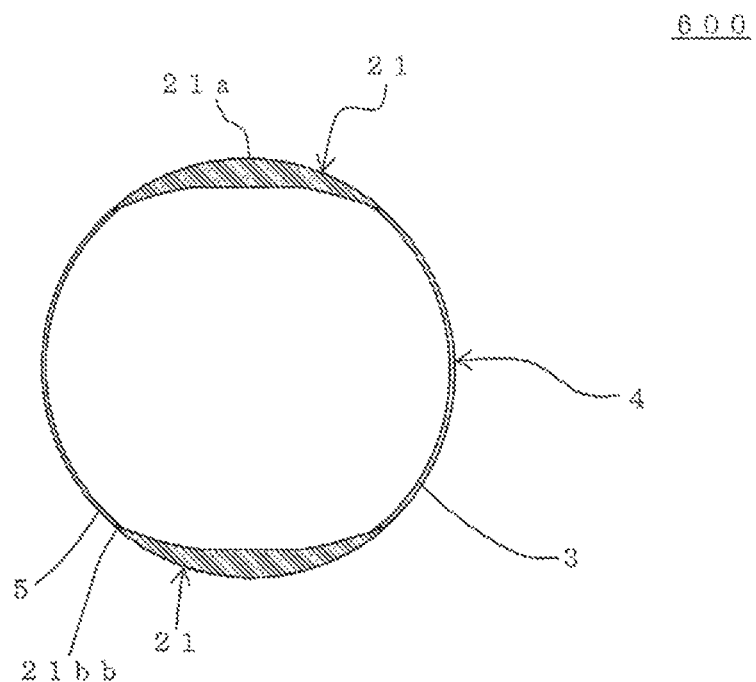
FIG. 13 is a schematic view showing a cross section which is perpendicular to a cell extending direction in a still further embodiment of the honeycomb structure of the present invention.

Moreover, at least part of a shape of a boundary between a honeycomb structure section 4 and an electrode section 21 is a straight line (linear) in a cross section which is perpendicular to a cell extending direction as in a honeycomb structure 600 shown in FIG. 13, which is also a preferable configuration. FIG. 13 is a schematic view showing a cross section which is perpendicular to a cell extending direction in a still further embodiment of the honeycomb structure of the present invention. The honeycomb structure 600 shown in FIG. 13 is similar to the honeycomb structure 500 shown in FIG. 10 to FIG. 12, except that at least part of the shape of the boundary between the honeycomb structure section 4 and the electrode section 21 is the straight line in the cross section which is perpendicular to the cell extending direction.

In the honeycomb structure 500 of the present embodiment, a thickness of the center portion 21a of the electrode section 21 is preferably from 0.2 to 5 mm, and further preferably from 0.5 to 3 mm. When the thickness is smaller than 0.2 mm, the effect of decreasing the bias of the temperature distribution when applying the voltage to the honeycomb structure deteriorates sometimes. When the thickness is larger than 5 mm, a temperature difference is easily made in an outer peripheral portion of the honeycomb structure, and large stress is generated sometimes in the honeycomb structure section, if there is a rapid temperature change during use of the honeycomb structure mounted on an exhaust system of an internal combustion engine.

In the honeycomb structure 500 of the present embodiment, an angle of 0.5 time a central angle of the center portion 21a of the electrode section 21 is preferably 25° or smaller in the cross section which is perpendicular to the cell extending direction. When the angle is larger than 25°, the effect of lowering a temperature around both the ends (both the peripheral edges) 21bb and 21bb of the electrode section 21 of the honeycomb structure 500 deteriorates sometimes.

In the honeycomb structure 500 of the present embodiment, when the center point of the electrode section 21 in the peripheral direction (the peripheral direction of the honeycomb structure section) is a position of "0°" and the peripheral edge 21bb of the electrode section 21 is a position of "an angle $\theta$ of 0.5 time a central angle $\alpha$ of the electrode section 21" (the position of the angle $\theta$) in the cross section which is perpendicular to the cell extending direction, a thickness of the electrode section 21 at a position of "0.5 time the angle $\theta$ (0.5$\theta$)" (the position rotated as much as 0.5$\theta$ in the peripheral direction from "the position of 0°" toward "the position of the angle $\theta$" (a midpoint between "the position of 0°" and "the position of the angle $\theta$")) is preferably 95% or smaller, further preferably from 10 to 90%, and especially preferably from 15 to 85% of the thickness of the electrode section 21 at the center point in the peripheral direction. When the thickness is larger than 95%, the effect of suppressing the bias of the temperature distribution when applying the voltage to the honeycomb structure deteriorates sometimes.

Moreover, in the honeycomb structure 500 of the present embodiment, a thickness of the electrode section 21 at a position of "0.8 time the angle $\theta$ (0.8$\theta$)" is preferably 80% or smaller, further preferably from 0.5 to 75%, and especially preferably from 1 to 65% of the thickness of the electrode section 21 at the center point in the peripheral direction, in the cross section which is perpendicular to the cell extending direction. When the thickness is larger than 80%, the effect of suppressing the bias of the temperature distribution when applying the voltage to the honeycomb structure deteriorates sometimes.

The honeycomb structure 500 of the present embodiment further preferably satisfies conditions of both the thickness of the electrode section at the above "position of 0.5$\theta$" and the thickness of the electrode section at the above "position of 0.8$\theta$".

In the honeycomb structure 500 of the present embodiment, the electrical resistivity of the electrode section 21 is preferably from 0.1 to 100 $\Omega$cm, further preferably from 0.5 to 20 $\Omega$cm, especially preferably from 1 to 3 $\Omega$cm, and most preferably from 1 to 2 $\Omega$cm. When the electrical resistivity is smaller than 0.1 $\Omega$cm, the end portions of the electrode section in the peripheral direction generate heat in a concentrated manner sometimes. When the electrical resistivity is larger than 100 $\Omega$cm, the current does not easily flow sometimes, and the effect of generating the heat evenly in the honeycomb structure (decreasing the bias of the temperature distribution) deteriorates sometimes.

In the honeycomb structure 500 of the present embodiment, the electrode section 21 preferably contains silicon carbide particles and silicon as main components, and is further preferably formed by using the silicon carbide particles and silicon as raw materials except usually contained impurities. Here, when "the silicon carbide particles and silicon are used as the main components", it is meant that a total mass of the silicon carbide particles and silicon is 90 mass % or larger than a mass of the whole electrode section. Thus, when the electrode section 21 contains the silicon carbide particles and silicon as the main components, the component of the electrode section 21 is the same as or close to a component of a honeycomb structure section 4 (when the material of the honeycomb structure section is silicon carbide), so that a thermal expansion coefficient of the electrode section 21 is the same as or close to that of the honeycomb structure section 4. Moreover, since the materials are the same or close, a joining strength between the electrode section 21 and the honeycomb structure section 4 also increases. Therefore, even when heat stress is applied to the honeycomb structure, the electrode section 21 can be prevented from peeling from the honeycomb structure section 4, or a joined portion between the electrode section 21 and the honeycomb structure section 4 can be prevented from being broken.

When the electrode section 21 contains the silicon carbide particles and silicon as the main components, a ratio of a mass of silicon contained in the electrode section 21 to "the total of the masses of the silicon carbide particles and silicon" contained in the electrode section 21 is preferably from 20 to 40 mass %, and further preferably from 25 to 35 mass %. In consequence, the electrical resistivity of the electrode section 21 can be in a range of 0.1 to 100 $\Omega$cm. When the ratio is smaller than 20 mass %, the electrical resistivity increases, a strength to bind silicon carbide deteriorates, and the electrode section 21 easily deteriorates sometimes.

When the main components of the electrode section 21 are the silicon carbide particles and silicon, an average particle diameter of the silicon carbide particles contained in the electrode section 21 is preferably from 10 to 60 µm, and further preferably from 20 to 60 µm. When the average particle diameter of the silicon carbide particles contained in the electrode section 21 is in such a range, the electrical resistivity of the electrode section 21 can be in a range of 0.1 to 100 $\Omega$cm. When an average pore diameter of the silicon carbide particles contained in the electrode section 21 is smaller than 10 µm, the electrical resistivity of the electrode section 21 excessively increases sometimes. When the average pore diameter of the silicon carbide particles contained in the electrode section 21 is larger than 60 µm, the strength of the electrode section 21 decreases, and the section easily breaks sometimes. The average particle diameter of the silicon carbide particles contained in the electrode section 21 is a value measured by a laser diffraction process.

A porosity of the electrode section 21 is preferably from 30 to 60%, and further preferably from 30 to 55%. When the porosity of the electrode section 21 is in such a range, a suitable electrical resistivity can be obtained. When the porosity of the electrode section 21 is smaller than 30%, the section is deformed sometimes during manufacturing. When the porosity is larger than 60%, the electrical resistivity excessively increases sometimes. The porosity is the value measured by a mercury porosimeter.

The average pore diameter of the electrode section 21 is preferably from 5 to 45 µm, and further preferably from 7 to 40 μm. When the average pore diameter of the electrode section 21 is in such a range, the suitable electrical resistivity can be obtained. When the average pore diameter of the electrode section 21 is smaller than 5 μm, the electrical resistivity of the electrode section 21 excessively increases sometimes. When the average pore diameter is larger than 45 μm, the strength of the electrode section 21 decreases, and the section easily breaks sometimes. The average pore diameter is the value measured by the mercury porosimeter.

Also in the honeycomb structure 500 of the present embodiment, the electrode section 21 may be provided with an electrode terminal protruding portion.

(2) Manufacturing Method of Honeycomb Structure:

Next, a manufacturing method of the honeycomb structure of the present invention will be described. There will be described a method of manufacturing the honeycomb structure 200 (see FIG. 4 to FIG. 6) which is still another embodiment of the above honeycomb structure of the present invention.

First, metal silicon powder (metal silicon), a binder, a surfactant, a pore former, water and the like are added to silicon carbide powder (silicon carbide), to prepare a forming raw material. A mass of metal silicon is preferably from 10 to 50 mass % of a total of a mass of the silicon carbide powder and the mass of metal silicon. An average particle diameter of the silicon carbide particles in the silicon carbide powder is preferably from 3 to 50 μm, and further preferably from 5 to 20 μm. An average particle diameter of metal silicon (the metal silicon powder) is preferably from 2 to 35 μm. The average particle diameters of the silicon carbide particles and metal silicon (the metal silicon particles) are values measured by the laser diffraction process. The silicon carbide particles are fine particles of silicon carbide constituting the silicon carbide powder. The metal silicon particles are fine particles of metal silicon constituting the metal silicon powder. Additionally, this is a blend of the forming raw materials when the material of the honeycomb structure section is the silicon-silicon carbide composite material, and metal silicon is not added when the material of the honeycomb structure section is silicon carbide.

Examples of the binder can include methylcellulose, hydroxypropyl methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the binder is preferably from 2.0 to 10.0 parts by mass while the total mass of the silicon carbide powder and the metal silicon powder is 100 parts by mass.

A content of the water is preferably from 20 to 60 parts by mass while the total mass of the silicon carbide powder and the metal silicon powder is 100 parts by mass.

As the surfactant, ethylene glycol, dextrin, fatty acid soap, polyalcohol or the like can be used. These surfactants may be used alone, or two or more of the surfactants may be combined and used. A content of the surfactant is preferably from 0.1 to 2.0 parts by mass while the total mass of the silicon carbide powder and the metal silicon powder is 100 parts by mass.

There is not any special restriction on the pore former as long as pores are formed after firing, and examples of the pore former can include graphite, starch, a resin balloon, a water absorbing resin, and silica gel. A content of the pore former is preferably from 0.5 to 10.0 parts by mass while the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, a die is clogged during forming. The average particle diameter of the pore former is the value measured by the laser diffraction process.

Next, the forming raw materials are kneaded to form a kneaded material. There is not any special restriction on a method of kneading the forming raw materials to form the kneaded material, and examples of the method can include methods using a kneader, a vacuum clay kneader and the like.

Next, the kneaded material is extruded, to form a honeycomb formed body. During the extrusion forming, a die having a desirable entire shape, cell shape, partition wall thickness, cell density and the like is preferably used. As a material of the die, a hard metal which does not easily wear is preferable. The honeycomb formed body has a constitution including partition walls to partition and form a plurality of cells which become through channels of a fluid, and an outer peripheral wall positioned in an outermost periphery.

Additionally, a shape of the honeycomb formed body may be a cylindrical shape, or a tubular shape where "a portion to be provided with the electrode section later" is formed into "the shape of the boundary between the honeycomb structure section and the electrode section in the obtained honeycomb structure". When the shape of the honeycomb formed body is the cylindrical shape, "the portion to be provided with the electrode section later" of the honeycomb formed body is preferably ground after drying the honeycomb formed body. When the honeycomb formed body is ground, the electrode section may be disposed in a ground portion, or an outer peripheral wall may be formed anew in the ground portion and the surface of the outer peripheral wall formed anew may be formed into "the shape of the boundary between the honeycomb structure section and the electrode section in the obtained honeycomb structure". When the outer peripheral wall is formed anew in the ground portion, the ground portion is preferably coated with the above forming raw material, and dried.

The size, partition wall thickness, cell density, outer peripheral wall thickness and the like of the honeycomb formed body can suitably be determined in accordance with a constitution of the honeycomb structure of the present invention to be prepared, in consideration of contraction during drying and firing.

The obtained honeycomb formed body is preferably dried. There is not any special restriction on a drying method, and examples of the drying method can include electromagnetic wave heating systems such as microwave heating drying and high frequency dielectric heating drying, and external heating systems such as hot air drying and superheating water vapor drying. Among these methods, a method of drying a predetermined amount of a water content by the electromagnetic wave heating system, and then drying the remaining water content by the external heating system is preferable in that the whole formed body can quickly and evenly dried so as to prevent cracks from being generated. As drying conditions, the water content of 33 to 99 mass % of the water content prior to the drying is preferably removed by the electromagnetic wave heating system, and then the water content is preferably decreased to 3 mass % or smaller by the external heating system. As the electromagnetic wave heating system, the dielectric heating drying is preferable, and as the external heating system, the hot air drying is preferable.

When a length of the honeycomb formed body in a central axis direction is not a desirable length, both end surfaces (both the end portions) are preferably cut to obtain the desirable length. There is not any special restriction on a cutting method, but examples of the method can include a method using a disc saw cutter or the like. Moreover, when the shape of the honeycomb formed body is the cylindrical shape, "the portion to be provided with the electrode section later" is preferably ground so as to obtain "the shape of the boundary between the honeycomb structure section and the electrode section in the obtained honeycomb structure" as described above.

Next, a center portion forming raw material to form the center portion of each electrode section is prepared. When the main components of the center portion are silicon carbide and silicon, the center portion forming raw material is preferably formed by adding predetermined additives to the silicon carbide powder and silicon powder, and kneading the materials.

Specifically, metal silicon powder (metal silicon), a binder, a surfactant, a pore former, water and the like are added to silicon carbide powder (silicon carbide), to knead and prepare the center portion forming raw material. A mass of metal silicon is preferably from 20 to 50 mass %, and further preferably from 30 to 45 mass % while a total mass of the silicon carbide powder and metal silicon is 100 mass %. An average particle diameter of the silicon carbide particles in the silicon carbide powder is preferably from 10 to 60 µm. When the average particle diameter is smaller than 10 µm, the electrical resistivity excessively decreases sometimes. When the average particle diameter is larger than 60 µm, the electrical resistivity excessively increases sometimes. The average particle diameter of the silicon carbide particles is a value measured by the laser diffraction process. The silicon carbide particles are fine particles of silicon carbide constituting the silicon carbide powder.

Examples of the binder can include methylcellulose, hydroxypropyl methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the binder is preferably from 0.1 to 5.0 parts by mass while the total mass of the silicon carbide powder and the metal silicon powder is 100 parts by mass.

A content of the water is preferably from 15 to 60 parts by mass while the total mass of the silicon carbide powder and the metal silicon powder is 100 parts by mass.

As the surfactant, ethylene glycol, dextrin, fatty acid soap, polyalcohol or the like can be used. These surfactants may be used alone, or two or more of the surfactants may be combined and used. A content of the surfactant is preferably from 0.1 to 2.0 parts by mass while the total mass of the silicon carbide powder and the metal silicon powder is 100 parts by mass.

There is not any special restriction on the pore former as long as the pores are formed after the firing, and examples of the pore former can include graphite, starch, a resin balloon, a water absorbing resin, and silica gel. A content of the pore former is preferably from 0.1 to 3.0 parts by mass while the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, and strength deterioration occurs sometimes. The average particle diameter of the pore former is the value measured by the laser diffraction process.

Then, a mixture obtained by mixing the silicon carbide powder (silicon carbide), metal silicon (the metal silicon powder), the binder, the surfactant, the pore former, the water and the like is preferably kneaded to prepare the paste-like center portion forming raw material. There is not any special restriction on a kneading method and, for example, a vertical stirrer can be used.

Next, an expanded portion forming raw material to form each of the expanded portions of each of the electrode sections is prepared. When the main components of the expanded portion are silicon carbide and silicon, the expanded portion forming raw material is preferably formed by adding predetermined additives to silicon carbide powder and silicon powder and kneading the materials.

Specifically, metal silicon powder (metal silicon), a binder, a surfactant, a pore former, water and the like are added to silicon carbide powder (silicon carbide), to knead and prepare the expanded portion forming raw material. A mass of metal silicon is preferably from 20 to 40 mass % while a total mass of the silicon carbide powder and metal silicon is 100 mass %. An average particle diameter of the silicon carbide particles in the silicon carbide powder is preferably from 10 to 60 µm. When the average particle diameter is smaller than 10 µm, the electrical resistivity excessively decreases sometimes. When the average particle diameter is larger than 60 µm, the electrical resistivity excessively increases sometimes. The average particle diameter of the silicon carbide particles is the value measured by the laser diffraction process. The silicon carbide particles are fine particles of silicon carbide constituting the silicon carbide powder.

Examples of the binder can include methylcellulose, hydroxypropyl methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the binder is preferably from 0.1 to 5.0 parts by mass while the total mass of the silicon carbide powder and the metal silicon powder is 100 parts by mass.

A content of the water is preferably from 15 to 60 parts by mass while the total mass of the silicon carbide powder and the metal silicon powder is 100 parts by mass.

As the surfactant, ethylene glycol, dextrin, fatty acid soap, polyalcohol or the like can be used. These surfactants may be used alone, or two or more of the surfactants may be combined and used. A content of the surfactant is preferably from 0.1 to 2.0 parts by mass while the total mass of the silicon carbide powder and the metal silicon powder is 100 parts by mass.

There is not any special restriction on the pore former as long as the pores are formed after the firing, and examples of the pore former can include graphite, starch, a resin balloon, a water absorbing resin, and silica gel. A content of the pore former is preferably from 0.1 to 3.0 parts by mass while the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, and strength deterioration occurs sometimes. The average particle diameter of the pore former is the value measured by the laser diffraction process.

Next, a mixture obtained by mixing the silicon carbide powder (silicon carbide), metal silicon (the metal silicon powder), the binder, the surfactant, the pore former, the water and the like is preferably kneaded to prepare the paste-like expanded portion forming raw material. There is not any special restriction on a kneading method and, for example, the vertical stirrer can be used.

Next, the side surface of the dried honeycomb formed body is preferably coated with the obtained center portion forming raw material and expanded portion forming raw material, respectively, to obtain shapes of the center portion 21a and the expanded portion 21b of the electrode section 21 in the honeycomb structure 200 shown in FIG. 4 to FIG. 6. There is not any special restriction on a method of coating the side surface of the honeycomb formed body with the center portion forming raw material and expanded portion forming raw material, but, for example, a printing method can be used. The honeycomb formed body is coated with the center portion forming raw material and the expanded portion forming raw material so that the whole outer peripheral shape is the round shape in the cross section which is perpendicular to the cell extending direction. Thus, when the side surface of the honeycomb formed body is simply coated with the center portion forming raw material and expanded portion forming raw material, dried and fired, the center portion and the expanded portion of the electrode section can be formed, and hence the electrode section can very easily be formed.

Additionally, when the honeycomb structure "where each electrode section does not have any boundary portions and is continuously formed in the cross section which is perpendicular to the cell extending direction" (see FIG. 10 to FIG. 12) is prepared, similarly to the above expanded portion forming raw material, a raw material to form the electrode section (the electrode section forming raw material) is prepared, and the side surface of the dried honeycomb formed body is preferably coated with the obtained electrode section forming raw material so as to obtain a desirable shape of the electrode section (the constitution of the electrode section of the honeycomb structure of the present invention).

Next, the center portion forming raw material and the expanded portion forming raw material which coat the side surface of the honeycomb formed body are preferably dried. Drying conditions are preferably from 50 to 100° C.

Next, an electrode terminal protruding portion forming member is preferably prepared. The electrode terminal protruding portion forming member is attached to the honeycomb formed body to form the electrode terminal protruding portion. There is not any special restriction on a shape of the electrode terminal protruding portion forming member, but the member is preferably formed into a shape shown in, for example, FIG. 4 to FIG. 6. Then, the obtained electrode terminal protruding portion forming member is preferably attached to a portion coated with the center portion forming raw material in the honeycomb formed body coated with the center portion forming raw material. Additionally, an order of the preparation of the honeycomb formed body, the preparation of the center portion forming raw material, the preparation of the expanded portion forming raw material and the preparation of the electrode terminal protruding portion forming member may be any order.

The electrode terminal protruding portion forming member is preferably obtained by forming and drying an electrode terminal protruding portion forming raw material (the raw material to form the electrode terminal protruding portion forming member). When main components of the electrode terminal protruding portion are silicon carbide and silicon, the electrode terminal protruding portion forming raw material is preferably formed by adding predetermined additives to the silicon carbide powder and silicon powder, and kneading the materials.

Specifically, metal silicon powder (metal silicon), a binder, a surfactant, a pore former, water and the like are added to silicon carbide powder (silicon carbide), to knead and prepare the electrode terminal protruding portion forming raw material. A mass of metal silicon is preferably from 20 to 40 mass % of a total of masses of the silicon carbide powder and metal silicon. An average particle diameter of the silicon carbide particles in the silicon carbide powder is preferably from 10 to 60 μm. When the average particle diameter is smaller than 10 μm, the electrical resistivity excessively decreases sometimes. When the average particle diameter is larger than 60 μm, the electrical resistivity excessively increases sometimes. An average particle diameter of the metal silicon powder (metal silicon) is preferably from 2 to 20 μm. When the average particle diameter is smaller than 2 μm, the electrical resistivity excessively decreases sometimes. When the average particle diameter is larger than 20 μm, the electrical resistivity excessively increases sometimes. The average particle diameters of the silicon carbide particles and metal silicon particles (metal silicon) are values measured by the laser diffraction process. The silicon carbide particles are fine particles of silicon carbide constituting the silicon carbide powder, and the metal silicon particles are fine particles of metal silicon constituting the metal silicon powder.

Examples of the binder can include methylcellulose, hydroxypropyl methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content of the binder is preferably from 2.0 to 10.0 parts by mass while the total mass of the silicon carbide powder and the metal silicon powder is 100 parts by mass.

A content of the water is preferably from 20 to 40 parts by mass while the total mass of the silicon carbide powder and the metal silicon powder is 100 parts by mass.

As the surfactant, ethylene glycol, dextrin, fatty acid soap, polyalcohol or the like can be used. These surfactants may be used alone, or two or more of the surfactants may be combined and used. A content of the surfactant is preferably from 0.1 to 2.0 parts by mass while the total mass of the silicon carbide powder and the metal silicon powder is 100 parts by mass.

There is not any special restriction on the pore former as long as the pores are formed after the firing, and examples of the pore former can include graphite, starch, a resin balloon, a water absorbing resin, and silica gel. A content of the pore former is preferably from 0.1 to 5.0 parts by mass while the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed sometimes. When the average particle diameter is larger than 30 μm, the die is clogged sometimes at the forming. The average particle diameter of the pore former is the value measured by the laser diffraction process.

Next, a mixture obtained by mixing the silicon carbide powder (silicon carbide), metal silicon (the metal silicon powder), the binder, the surfactant, the pore former, the water and the like is preferably kneaded to form the electrode terminal protruding portion forming raw material. There is not any special restriction on a kneading method and, for example, the vertical stirrer can be used.

There is not any special restriction on a method of forming the obtained electrode terminal protruding portion forming raw material into the shape of the electrode terminal protruding portion forming member, and examples of the method can include a method of processing the member after extrusion forming.

The electrode terminal protruding portion forming raw material is preferably formed into the shape of the electrode terminal protruding portion forming member, and then dried to obtain the electrode terminal protruding portion forming member. Drying conditions are preferably from 50 to 100° C.

Next, the electrode terminal protruding portion forming member is preferably attached to the honeycomb formed body coated with the center portion forming raw material. There is not any special restriction on a method of attaching the electrode terminal protruding portion forming member to the honeycomb formed body (the portion of the honeycomb formed body which is coated with the center portion forming raw material), but the electrode terminal protruding portion forming member is preferably attached to the honeycomb formed body by use of the above center portion forming raw material. For example, "the surface of the electrode terminal protruding portion forming member which is attached to the honeycomb formed body (the surface which comes in contact with the honeycomb formed body)" is preferably coated with the center portion forming raw material, and the electrode terminal protruding portion forming member is preferably attached to the honeycomb formed body so that "the surface coated with the center portion forming raw material" comes in contact with the honeycomb formed body.

Then, "the honeycomb formed body which is coated with the center portion forming raw material and the expanded portion forming raw material and to which the electrode terminal protruding portion forming member is attached" is preferably dried and fired, to obtain the honeycomb structure of the present invention.

Drying conditions at this time are preferably from 50 to 100° C.

Moreover, calcinating is preferably performed to remove the binder and the like prior to the firing. The calcinating is preferably performed at 400 to 500° C. in the atmosphere for 0.5 to 20 hours. There is not any special restriction on a calcinating and firing method, and the firing can be performed by using an electric furnace, a gas furnace or the like. As firing conditions, heating is preferably performed at 1400 to 1500° C. in an inactive atmosphere of nitrogen, argon or the like for 1 to 20 hours. Moreover, an oxidation treatment is preferably performed at 1200 to 1350° C. for 1 to 10 hours after the firing, to enhance durability.

It is to be noted that the electrode terminal protruding portion forming member may be attached before firing the honeycomb formed body, or attached after firing the honeycomb formed body. When the electrode terminal protruding portion forming member is attached to the honeycomb formed body after the firing, the member is preferably fired again on the above conditions afterwards.

EXAMPLES

Hereinafter, the present invention will further specifically be described with respect to examples, but the present invention is not limited to theses examples.

Example 1

Silicon carbide (SiC) powder and metal silicon (Si) powder were mixed at a mass rate of 80:20, hydroxypropyl methylcellulose as a binder and a water absorbing resin as a pore former were added to this mixture, water was also added to obtain a forming raw material, and the forming raw material was kneaded by a vacuum clay kneader, to prepare a columnar kneaded material. A content of the binder was 7 parts by mass while a total of the silicon carbide (SiC) powder and the metal silicon (Si) powder was 100 parts by mass, a content of the pore former was 3 parts by mass while the total of the silicon carbide (SiC) powder and the metal silicon (Si) powder was 100 parts by mass, and a content of the water was 42 parts by mass while the total of the silicon carbide (SiC) powder and the metal silicon (Si) powder was 100 parts by mass. An average particle diameter of the silicon carbide powder was 20 µm, and an average particle diameter of the metal silicon powder was 6 µm. Moreover, an average particle diameter of the pore former was 20 µm. The average particle diameters of silicon carbide, metal silicon and the pore former were values measured by a laser diffraction process.

The obtained columnar kneaded material was formed by using an extrusion forming machine, to obtain an oval honeycomb formed body. The obtained honeycomb formed body was dried by high frequency dielectric heating, and dried at 120° C. for two hours by use of a hot air drier, and then both end surfaces of the body were cut as much as a predetermined amount.

Next, a center portion forming raw material was prepared. First, silicon carbide (SiC) powder and metal silicon (Si) powder were mixed at a mass rate of 40:60, to this mixture, there were added hydroxypropyl methylcellulose as a binder, glycerin as a moisture retaining agent, and a surfactant as a dispersing agent, and water was also added to mix the materials. The mixture was kneaded to obtain the center portion forming raw material. A content of the binder was 0.5 part by mass while a total of the silicon carbide (SiC) powder and the metal silicon (Si) powder was 100 parts by mass, a content of glycerin was 10 parts by mass while the total of the silicon carbide (SiC) powder and the metal silicon (Si) powder was 100 parts by mass, a content of the surfactant was 0.3 part by mass while the total of the silicon carbide (SiC) powder and the metal silicon (Si) powder was 100 parts by mass, and a content of the water was 42 parts by mass while the total of the silicon carbide (SiC) powder and the metal silicon (Si) powder was 100 parts by mass. An average particle diameter of the silicon carbide powder was 52 µm, and an average particle diameter of the metal silicon powder was 6 µm. The average particle diameters of silicon carbide and metal silicon were values measured by the laser diffraction process. The kneading was performed by a vertical stirrer.

Next, an expanded portion forming raw material was prepared. First, silicon carbide (SiC) powder and metal silicon (Si) powder were mixed at a mass rate (SiC:Si) of 30:70, to this mixture, there were added hydroxypropyl methylcellulose as a binder, glycerin as a moisture retaining agent, and a surfactant as a dispersing agent, and water was also added to mix the materials. The mixture was kneaded to obtain the expanded portion forming raw material. A content of the binder was 0.5 part by mass while the total of the silicon carbide (SiC) powder and the metal silicon (Si) powder was 100 parts by mass, a content of glycerin was 10 parts by mass while the total of the silicon carbide (SiC) powder and the metal silicon (Si) powder was 100 parts by mass, a content of the surfactant was 0.3 part by mass while the total of the silicon carbide (SiC) powder and the metal silicon (Si) powder was 100 parts by mass, and a content of the water was 42 parts by mass while the total of the silicon carbide (SiC) powder and the metal silicon (Si) powder was 100 parts by mass. An average particle diameter of the silicon carbide powder was 52 µm, and an average particle diameter of the metal silicon powder was 6 µm. The average particle diameters of silicon carbide and metal silicon were values measured by the laser diffraction process. The kneading was performed by the vertical stirrer.

Next, two ground portions of the side surface of the dried honeycomb formed body were coated with the center portion forming raw material and the expanded portion forming raw material in such a band-like shape as to extend over both the end surfaces of the honeycomb formed body, so that shapes of the center portion 21a and the expanded portion 21b of the electrode section 21 of the honeycomb structure 100 shown in FIG. 4 to FIG. 6 were formed. An outer peripheral shape of a cross section of the whole honeycomb formed body coated with the center portion forming raw material and the expanded portion forming raw material which was perpendicular to a cell extending direction was a round shape.

Next, the center portion forming raw material and the expanded portion forming raw material which coated the honeycomb formed body were dried. Drying conditions were 70° C.

Next, an electrode terminal protruding portion forming member was prepared. First, silicon carbide (SiC) powder and metal silicon (Si) powder were mixed at a mass rate of 60:40, hydroxypropyl methylcellulose as a binder was added to this mixture, and water was also added to mix the materials. The mixture was kneaded to obtain an electrode terminal protruding portion forming raw material. The electrode terminal protruding portion forming raw material was kneaded by using a vacuum clay kneader to obtain a kneaded material. A content of the binder was 4 parts by mass while the total of the silicon carbide (SiC) powder and the metal silicon (Si) powder was 100 parts by mass, and a content of water was 22 parts by mass while the total of the silicon carbide (SiC) powder and the metal silicon (Si) powder was 100 parts by mass. An average particle diameter of the silicon carbide powder was 52 μm, and an average particle diameter of the metal silicon powder was 6 μm. The average particle diameters of silicon carbide and metal silicon were values measured by the laser diffraction process.

The obtained kneaded material was formed by using the vacuum clay kneader, processed into a shape of the electrode terminal protruding portion 22 shown in FIG. 4 to FIG. 6 (the shape including a substrate and a protruding portion), and dried, to obtain the electrode terminal protruding portion forming member. Moreover, drying conditions were 70° C. A portion corresponding to the plate-like substrate 22a had a size of "3 mm×12 mm×15 mm". Furthermore, a portion corresponding to the protruding portion 22b was formed into a columnar shape having a bottom surface diameter of 7 mm and a length of 10 mm in a central axis direction. Two electrode terminal protruding portion forming members were prepared.

Next, the two electrode terminal protruding portion forming members were attached to two portions of the honeycomb formed body which were coated with the center portion forming raw material, respectively. The electrode terminal protruding portion forming members were attached to the portions of the honeycomb formed body which were coated with the center portion forming raw material, by use of the center portion forming raw material. Afterward, "the honeycomb formed body which was coated with the center portion forming raw material and the expanded portion forming raw material and to which the electrode terminal protruding portion forming members were attached" was degreased, fired, and further subjected to an oxidation treatment to obtain a honeycomb structure. Degreasing conditions were 550° C. for three hours. Firing conditions were 1450° C. in an argon atmosphere for two hours. Oxidation treatment conditions were 1300° C. for one hour.

An average pore diameter (pore diameters) of partition walls of the obtained honeycomb structure was 8.6 μm, and a porosity thereof was 41%. The average pore diameter and the porosity were values measured by a mercury porosimeter. Moreover, in the honeycomb structure, a partition wall thickness was 109 μm, and a cell density was 93 cells/cm². In addition, the bottom surface of the honeycomb structure had a round shape with a diameter of 93 mm, and a length of the honeycomb structure in a cell extending direction was 100 mm. Moreover, an isostatic strength of the obtained honeycomb structure was 2.5 MPa. The isostatic strength was a breaking strength measured under a hydrostatic pressure in water.

Moreover, an angle of 0.5 time a central angle of the electrode section (the whole electrode section) in a cross section of the honeycomb structure which was perpendicular to the cell extending direction was 40°. Moreover, a thickness of the thickest portion of the center portion of the electrode section was 3.0 mm, and a length of the center portion in a peripheral direction in the cross section which was perpendicular to the cell extending direction was 20 mm (an angle θ of 0.5 time a central angle α was about 12.4°). Furthermore, an electrical resistivity of the center portion of the electrode section was 0.6 Ωcm, an electrical resistivity of the expanded portion of the electrode section was 1.3 Ωcm, an electrical resistivity of a honeycomb structure section was 48 Ωcm, and an electrical resistivity of the electrode terminal protruding portion was 1.3 Ωcm. Moreover, one of the two electrode sections in the cross section which was perpendicular to the cell extending direction was disposed on an opposite side of the other electrode section via the center of the honeycomb formed body. Furthermore, the whole shape (excluding the electrode terminal protruding portions) of the obtained honeycomb structure was a cylindrical shape. In addition, a thickness of the center portion of the electrode section was 3 mm, and was an even thickness. Furthermore, when the center point of the electrode section in the peripheral direction was a position of "0°" and the peripheral edge of the electrode section was a position of "the angle θ of 0.5 time the central angle α of the electrode section" in the cross section which was perpendicular to the cell extending direction, a thickness of the electrode section at a position of "0.5 time the angle θ (0.5θ)" was 80% of the thickness of the electrode section at the center point in the peripheral direction. Additionally, in the cross section which was perpendicular to the cell extending direction, a thickness of the electrode section at a position of "0.8 time the angle θ (0.8θ)" was 35% of the thickness of the electrode section at the center point in the peripheral direction.

There were measured temperatures "at a position where an end portion of the electrode section (the end portion in a peripheral direction) came in contact, and a position where the center point of the electrode section in the peripheral direction came in contact, in the cross section which was perpendicular to the cell extending direction" of the honeycomb structure section, when applying a voltage of 600 V to the obtained honeycomb structure, and the higher temperature was obtained as the highest temperature. In the honeycomb structure section, any of the position where the end portion of the electrode section (the end portion in the peripheral direction) comes in contact and the position where the center point of the electrode section in the peripheral direction comes in contact is a position through which a current flows most, and is a portion having the highest temperature in the honeycomb structure.

Additionally, the electrical resistivities of the honeycomb section, the electrode section (the center portion and the expanded portion) and the electrode terminal protruding portion were measured by the following method. A test piece of 10 mm×10 mm×50 mm was prepared by using the same material as that of a measurement object (i.e., the test pieces were prepared by using the same material as that of the honeycomb structure section when measuring the electrical resistivity of the honeycomb structure section, using the same material as that of the electrode section when measuring the electrical resistivity of the electrode section, and using the same material as that of the electrode terminal protruding portion when measuring the electrical resistivity of the electrode terminal protruding portion, respectively). The whole surfaces of both end portions of each test piece (the surface of 10 mm×10 mm) were coated with a silver paste, and connected to an electric wiring so that energization was possible. The test piece was connected to a voltage applying current measuring device, to apply the voltage. A thermocouple was disposed at the center portion of the test piece, and a change of a test piece temperature at the applying of the voltage with elapse of time was confirmed with a recorder. 600 V was applied, a current value and a voltage value in a state where the test piece temperature was 400° C. were measured, and the electrical resistivity was calculated from the obtained current value and voltage value and a test piece dimension.

Figure 7:
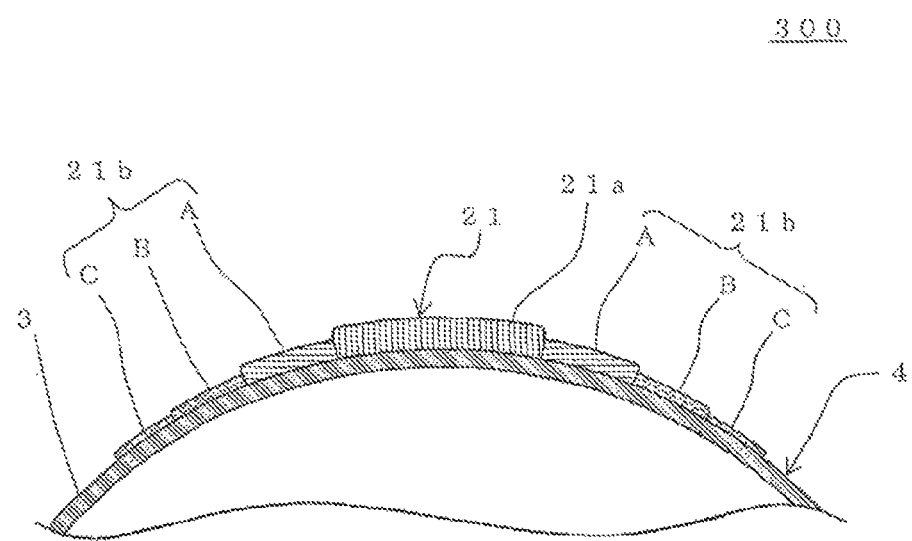
FIG. 7 is a schematic view showing part of a cross section which is perpendicular to a cell extending direction in a honeycomb structure of Reference Example 1.

Moreover, a canning test of the obtained honeycomb structure was performed. The canning test was performed as follows. An outer peripheral portion of the honeycomb structure was covered with a member made of a ceramic fiber mat, and the honeycomb structure was pressed into a metal can in a state where the above-mentioned ceramic fiber mat was compressed by a surface pressure of 0.3 MPa applied to the outer periphery (the metal can). When cracks were generated in the honeycomb structure, it was considered that the cracks were present, and when the cracks were not generated (were absent), the honeycomb structure was passable.

ing raw material, and thicknesses of electrode section expanded portions were changed stepwise as in the honeycomb structure 300 shown in FIG. 7. The thickness of the expanded portion was changed in three divided stages (regions A, B and C: see FIG. 7). The thickness of the region A which came in contact with a center portion was 3.0 mm, the thickness of the region B which came in contact with the region A was 1.5 mm, and the thickness of the region C which came in contact with the region B and was positioned on the outermost side was 0.5 mm. Moreover, in a cross section which was perpendicular to a cell extending direction, a length of each of the regions A positioned on both sides of the center portion in a peripheral direction was 3 mm (a central angle was about 3.7°). Furthermore, in the cross section which was perpendicular to the cell extending direction, a length of each of the regions B positioned on outer sides of the regions A (on the opposite sides of a position of the center portion) in the peripheral direction was 12 mm (a central angle was about 15.0°). Additionally, in the cross section which was perpendicular to the cell extending direction, a length of each of the regions C positioned on outer sides of the regions B (on the opposite side of the position of each of the regions A) in the peripheral direction was 5 mm (a central angle was about 6.2°. In the honeycomb structure of Reference Example 1, the honeycomb structure section was cylindrical, and the whole honeycomb structure (excluding the electrode terminal protruding portions) was not cylindrical. Similarly to Example 1, "the highest temperature" of the

TABLE 1

| | Electrode section | | | | Electrical resistivity | | |
|---|---|---|---|---|---|---|---|
| | 0.5 time central angle (°) | Electrical resistivity (Ωcm) | | | of honeycomb structure section (Ωcm) | Highest temp. (° C.) | Presence/absence of cracks at canning test |
| | | Whole | Center portion | Expanded portion | Shape | | |
| Example 1 | 40 | — | 0.6 | 1.3 | Whole shape is cylindrical | 48 | 127 | Nil |
| Comparative Example 1 | 10 | 1.3 | — | — | Whole shape is cylindrical | 48 | 218 | Nil |
| Example 2 | 15 | 1.3 | — | — | Whole shape is cylindrical | 48 | 184 | Nil |
| Example 3 | 40 | 1.3 | — | — | Whole shape is cylindrical | 48 | 127 | Nil |
| Example 4 | 65 | 1.3 | — | — | Whole shape is cylindrical | 48 | 185 | Nil |
| Comparative Example 2 | 70 | 1.3 | — | — | Whole shape is cylindrical | 48 | 220 | Nil |
| Comparative Example 3 | 40 | 1.3 | — | — | Whole shape is cylindrical | 0.5 | 245 | Nil |
| Example 5 | 40 | 1.3 | — | — | Whole shape is cylindrical | 1 | 177 | Nil |
| Example 6 | 40 | 1.3 | — | — | Whole shape is cylindrical | 200 | 168 | Nil |
| Comparative Example 4 | 40 | 1.3 | — | — | Whole shape is cylindrical | 210 | 222 | Nil |
| Reference Example 1 | 23 | — | 0.6 | 1.3 | Honeycomb structure section is cylindrical | 48 | 278 | Present |
| Comparative Example 5 | 40 | 1.3 | — | — | Honeycomb structure section is cylindrical | 48 | 211 | Present |

Reference Example 1

A honeycomb structure was prepared similarly to Example 1, except that a honeycomb formed body was not ground, the cylindrical honeycomb formed body was coated with a center portion forming raw material and an expanded portion form-honeycomb structure was measured. Results are shown in Table 1. FIG. 7 is a schematic view showing part of the cross section of the honeycomb structure of Reference Example 1 which is perpendicular to the cell extending direction.

It is seen from Table 1 that in the honeycomb structure of Example 1, the highest temperature is very low as compared with the honeycomb structure of Reference Example 1. When the highest temperature of the honeycomb structure is low, it is indicated that the bias of the temperature distribution in the honeycomb structure is suppressed.

Examples 2 to 6 and Comparative Examples 1 to 4

Similarly to Example 1, honeycomb structures were prepared, except that each honeycomb formed body was coated with an expanded portion forming raw material so as to form electrode sections arranged in the honeycomb structure 500 shown in FIG. 10 to FIG. 12 (the electrode sections which do not have any boundary portions and are continuously formed in a cross section which is perpendicular to a cell extending direction), and except that "a value (°) of 0.5 time a central angle of the electrode section" and "an electrical resistivity (Ωcm) of a honeycomb structure section" were changed as shown in Table 1. A shape of the electrode section was the same shape as a shape of the whole electrode section (the whole section obtained by combining a center portion and expanded portions) of the honeycomb structure of Example 1. The electrical resistivity of the honeycomb structure section was changed in accordance with an average particle diameter of silicon carbide. Similarly to Example 1, "the highest temperature" of the honeycomb structure was measured, and "the canning test" was performed. Results are shown in Table 1.

Comparative Example 5

A honeycomb structure was prepared similarly to Reference Example 1, except that each electrode section "was formed continuously so that the section did not have any boundary portions in a cross section which was perpendicular to a cell extending direction", and except that a constant thickness of 3 mm was set. Similarly to Example 1, "the highest temperature" of the honeycomb structure was measured, and "the canning test" was performed. Results are shown in Table 1.

It is seen from Table 1 that when an angle of 0.5 time a central angle of the electrode section is from 15 to 65°, "the highest temperature" is low and the temperature of the whole honeycomb structure section is more even. Moreover, it is seen that when the whole shape of the honeycomb structure is cylindrical, any cracks are not generated in the canning test.

Industrial Applicability

A honeycomb structure of the present invention can suitably be used as a catalyst carrier for an exhaust gas purification device which purifies an exhaust gas of a car.

Description Of Reference Numerals

1: partition wall, 2: cell, 3: outer peripheral wall, 4: honeycomb structure section, 5: side surface, 11: one end surface, 12: other end surface, 21: electrode section, 21a: center portion, 21b: expanded portion, 21ba: end portion which comes in contact with the center portion, 21bb: peripheral edge (side edge), 21c: one end portion (of the electrode section), 21d: other end portion (of the electrode section), 22: electrode terminal protruding portion, 22a: substrate, 22b: protruding portion, 100, 200, 300, 400 and 500: honeycomb structure, O: center, α: central angle, β: angle, θ: angle of 0.5 time the central angle, P: position where the side edge of the expanded portion of the electrode section comes in contact, A, B, and C: region of the expanded portion of the electrode section, and S: boundary surface.

The invention claimed is:

1. A honeycomb structure comprising: a tubular honeycomb structure section including porous partition walls which partition and form a plurality of cells extending from one end surface to the other end surface to become through channels of a fluid, and an outer peripheral wall positioned in an outermost periphery; and a pair of electrode sections arranged on a side surface of the honeycomb structure section, wherein an electrical resistivity of the honeycomb structure section is from 1 to 200Ωcm, each of the pair of electrode sections is formed into a band-like shape extending in a cell extending direction of the honeycomb structure section, the one electrode section in the pair of electrode sections is disposed on an opposite side of the other electrode section in the pair of electrode sections via the center of the honeycomb structure section in a cross section which is perpendicular to the cell extending direction, an angle which is 0.5 time as large as a central angle of each of the electrode sections is from 15 to 65° in the cross section which is perpendicular to the cell extending direction, each of the electrode sections is formed so as to become thinner from a center portion in a peripheral direction of the honeycomb structure section toward both ends in the peripheral direction in the cross section which is perpendicular to the cell extending direction, and an outer peripheral shape is a round shape in the cross section which is perpendicular to the cell extending direction.

2. The honeycomb structure according to claim 1, wherein each of the electrode sections is constituted of the center portion in the peripheral direction of the honeycomb structure section, and expanded portions positioned on both sides of the center portion in the peripheral direction in the cross section which is perpendicular to the cell extending direction, and the electrical resistivity of the center portion of the electrode section is smaller than that of each of the expanded portions of the electrode section.

3. The honeycomb structure according to claim 2, wherein the electrical resistivity of the center portion of the electrode section is from 0.2 to 10Ωcm.

4. The honeycomb structure according to claim 2, wherein the electrical resistivity of the center portion of the electrode section is from 1 to 60% of that of the expanded portion of the electrode section.

5. The honeycomb structure according to claim 2, wherein a thickness of the thickest portion of the center portion of the electrode section is from 0.2 to 5.0 mm.

6. The honeycomb structure according to claim 3, wherein the electrical resistivity of the center portion of the electrode section is from 1 to 60% of that of the expanded portion of the electrode section.

7. The honeycomb structure according to claim 6, wherein a thickness of the thickest portion of the center portion of the electrode section is from 0.2 to 5.0 mm.

8. The honeycomb structure according to claim 7, wherein in the cross section which is perpendicular to the cell extending direction, a shape of a boundary between the honeycomb structure section and the electrode section is a circular shape of a curvature radius which is larger than a curvature radius in the whole outer peripheral shape.

9. The honeycomb structure according to claim 7, wherein in the cross section which is perpendicular to the cell extending direction, at least part of the shape of the boundary between the honeycomb structure section and the electrode section is a straight line.

10. The honeycomb structure according to claim 8,
wherein in the cross section which is perpendicular to the cell extending direction, the shape of the boundary between the honeycomb structure section and the electrode section is a circular shape of a curvature radius which is from 1.5 to 5 times as large as the curvature radius in the whole outer peripheral shape.

11. The honeycomb structure according to claim 1,
wherein in the cross section which is perpendicular to the cell extending direction, a shape of a boundary between the honeycomb structure section and the electrode section is a circular shape of a curvature radius which is larger than a curvature radius in the whole outer peripheral shape.

12. The honeycomb structure according to claim 11,
wherein in the cross section which is perpendicular to the cell extending direction, the shape of the boundary between the honeycomb structure section and the electrode section is a circular shape of a curvature radius which is from 1.5 to 5 times as large as the curvature radius in the whole outer peripheral shape.

13. The honeycomb structure according to claim 1,
wherein in the cross section which is perpendicular to the cell extending direction, at least part of the shape of the boundary between the honeycomb structure section and the electrode section is a straight line.

14. The honeycomb structure according to claim 1,
wherein each of the electrode sections does not have any boundary portions and is continuously formed in the cross section which is perpendicular to the cell extending direction.

15. The honeycomb structure according to claim 14,
wherein the electrical resistivity of the electrode section is from 0.1 to 100Ωcm.

16. The honeycomb structure according to claim 14,
wherein in the cross section which is perpendicular to the cell extending direction, at least part of a shape of a boundary between the honeycomb structure section and the electrode section is a straight line.

17. The honeycomb structure according to claim 15,
wherein in the cross section which is perpendicular to the cell extending direction, at least part of a shape of a boundary between the honeycomb structure section and the electrode section is a straight line.

18. The honeycomb structure according to claim 17,
wherein in the cross section which is perpendicular to the cell extending direction, the angle which is 0.5 time as large as the central angle of the center portion of the electrode section is from 20 to 40°.

19. The honeycomb structure according to claim 1,
wherein in the cross section which is perpendicular to the cell extending direction, the angle which is 0.5 time as large as the central angle of the center portion of the electrode section is from 20 to 40°.

20. The honeycomb structure according to claim 1,
wherein at a center position of the center portion of each of the electrode sections in the cell extending direction, there is disposed an electrode terminal protruding portion to which an electric wiring is fastened.

* * * * *